(12) United States Patent
Encinosa et al.

(10) Patent No.: US 10,800,111 B2
(45) Date of Patent: Oct. 13, 2020

(54) COMPOSITE STRUCTURE FABRICATION SYSTEMS AND METHODS

(71) Applicant: The Boeing Company, Huntington Beach, CA (US)

(72) Inventors: Jose L. Encinosa, Lake Forest Park, WA (US); Samuel F. Zambrana, Auburn, WA (US); Daniel M. Rotter, Lake Forest Park, WA (US); Michael Robert Chapman, Federal Way, WA (US); Stephen K. Halladin, Renton, WA (US); Benjamin Bowen Lee, Tacoma, WA (US); Joshua Dee Little, Marysville, WA (US); Douglas Alan McCarville, Bonney Lake, WA (US); Jason A. Medenciy, Seattle, WA (US); Russell D. Chiupka, Kirkland, WA (US); Marcin Artur Rabiega, Kent, WA (US); Andrey F. Yurchik, Redmond, WA (US); Martin W. Hansen, Edgewood, WA (US); Thomas P. Harper, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1053 days.

(21) Appl. No.: 14/740,493

(22) Filed: Jun. 16, 2015

(65) Prior Publication Data

US 2016/0368226 A1    Dec. 22, 2016

(51) Int. Cl.
*B29C 70/30* (2006.01)
*B29C 70/38* (2006.01)
(Continued)

(52) U.S. Cl.
CPC .............. *B29C 70/30* (2013.01); *B29C 31/08* (2013.01); *B29C 65/02* (2013.01); *B29C 70/38* (2013.01);
(Continued)

(58) Field of Classification Search
CPC ...... B65H 85/00; B65H 83/02; B32B 43/066; B29C 70/30; B29C 70/38; B29C 31/08
See application file for complete search history.

(56) References Cited

U.S. PATENT DOCUMENTS

| 4,475,976 A | 10/1984 | Mittelstadt et al. |
| 4,512,837 A * | 4/1985 | Sarh .................... B29C 63/0034 156/189 |

(Continued)

FOREIGN PATENT DOCUMENTS

| JP | 2012501274 | 1/2012 |
| JP | 2016501756 | 1/2016 |

OTHER PUBLICATIONS

European Patent Office, Extended European Search Report for foreign counterpart European Patent Application No. EP 16174447, dated Oct. 27, 2016.

(Continued)

*Primary Examiner* — Michael N Orlando
*Assistant Examiner* — John Blades
(74) *Attorney, Agent, or Firm* — DASCENZO Intellectual Property Law, P.C.

(57) ABSTRACT

Composite structure fabrication systems and methods. The systems include a plurality of ply carriers, each of which is configured to support at least one ply segment, and an elongate forming mandrel, which defines an elongate ply forming surface that is shaped to define a surface contour of the composite structure. The systems further include a carrier transfer device, which is configured to selectively convey a selected ply carrier from a ply kitting area to an intermediate location, and a forming machine, which is configured to deform the selected ply carrier and a respective ply segment over a selected portion of the elongate ply forming surface. The forming machine further is configured to separate the selected ply carrier from the respective ply (Continued)

segment and return the selected ply carrier to the carrier transfer device. The methods include methods of operating the systems.

20 Claims, 11 Drawing Sheets

(51) Int. Cl.
 *B29C 31/08* (2006.01)
 *B29C 65/02* (2006.01)
 *B29L 31/30* (2006.01)
(52) U.S. Cl.
 CPC ........ *B29L 2031/3076* (2013.01); *Y02T 50/40* (2013.01)

(56) References Cited

U.S. PATENT DOCUMENTS

| | | | |
|---|---|---|---|
| 5,427,518 A | 6/1995 | Morizot et al. | |
| 7,879,177 B2 | 2/2011 | McCowin et al. | |
| 8,142,181 B2 | 3/2012 | Willden et al. | |
| 8,568,551 B2 | 10/2013 | Brennan et al. | |
| 8,916,010 B2 | 12/2014 | Brennan et al. | |
| 8,936,695 B2 | 1/2015 | Rotter et al. | |
| 2004/0098852 A1* | 5/2004 | Nelson | B29C 70/202 29/428 |
| 2009/0148647 A1 | 6/2009 | Jones et al. | |
| 2010/0011580 A1 | 1/2010 | Brennan et al. | |
| 2014/0065354 A1 | 3/2014 | Smith, Jr. et al. | |

OTHER PUBLICATIONS

Japanese Patent Office, Office Action for foreign counterpart Japanese Patent Application No. JP2016117925, dated Apr. 7, 2020.
English translation of Japanese Patent Office, Office Action for foreign counterpart Japanese Patent Application No. JP2016117925, dated Apr. 7, 2020.
Machine-generated English translation of the abstract of JP2012501274, downloaded from Espacenet.com Jul. 6, 2020.
Machine-generated English translation of the abstract of JP2016501756, downloaded from Espacenet.com Jul. 6, 2020.

* cited by examiner

COMPOSITE STRUCTURE FABRICATION SYSTEMS AND METHODS

FIELD

The present disclosure relates to composite structure fabrication systems and methods.

BACKGROUND

Fabrication of large composite structures, such as aircraft, often may involve kitting, layup, assembly, and/or curing of elongate composite structures that may be many tens, or even hundreds, of feet long. Fabrication of such elongate composite structures presents unique manufacturing challenges.

Traditional manufacturing methods for fabricating composite structures include manually locating a plurality of plies of composite material on a layup mandrel to produce and/or define a composite layup. The composite layup subsequently is cured, on the layup mandrel, to produce and/or define the composite structure. While such traditional manufacturing methods may be effective at producing smaller composite structures, they may be inefficient when applied to producing larger composite structures. As an example, a manufacturing floor space needed to fabricate large composite structures utilizing traditional manufacturing methods may be substantial. As another example, an amount of time required to fabricate large composite structures utilizing traditional manufacturing methods may be quite large.

Either of these manufacturing constraints may increase the cost of fabrication of the large composite structure. Thus, there exists a need for improved composite structure fabrication systems and methods.

SUMMARY

Composite structure fabrication systems and methods are disclosed herein. The systems include a plurality of ply carriers, each of which defines a ply support surface that is configured to support at least one ply segment. The systems also include an elongate forming mandrel that defines an elongate ply forming surface that is shaped to define a surface contour of the composite structure. The elongate ply forming surface also is configured to receive a plurality of ply segments to define a plurality of plies of composite material. The plurality of plies of composite material at least partially defines the composite structure. The systems further include a carrier transfer device, which is configured to selectively convey a selected ply carrier from a ply kitting area to an intermediate location. The systems also include a forming machine, which is configured to receive the selected ply carrier at the intermediate location and to deform the selected ply carrier and a respective ply segment over a selected portion of the elongate ply forming surface. The forming machine further is configured to separate the selected ply carrier from the respective ply segment and to return the selected ply carrier to the carrier transfer device. The systems may include a controller that is programmed to control operation of the carrier transfer device and the forming machine.

The methods include methods of fabricating a composite structure and/or methods of operating the systems. The methods include conveying a selected ply carrier from a ply kitting area to a selected location along a length of an elongate forming mandrel. The elongate forming mandrel defines an elongate ply forming surface that is shaped to define a surface contour of the composite structure. The elongate forming mandrel further is configured to receive a plurality of ply segments to define a plurality of plies of composite material. The plurality of plies of composite material at least partially defines the composite structure. The methods further include translating a forming machine along the length of the elongate forming mandrel to the selected location and receiving the selected ply carrier with the forming machine. The methods also include deforming the selected ply carrier and a respective ply segment over a selected portion of the elongate ply forming surface with the forming machine. The respective ply segment is supported by the selected ply carrier during the deforming. The methods further include releasing the respective ply segment from the selected ply carrier while retaining the respective ply segment on the selected portion of the elongate ply forming surface. The methods also include returning the selected ply carrier to the ply kitting area with the forming machine. The methods further include repeating the conveying, the translating, the receiving, the deforming, the releasing, and the returning with a plurality of ply carriers to locate the plurality of ply segments on the elongate ply forming surface and at least partially produce and/or define an uncured composite structure.

DESCRIPTION

Figure 1:
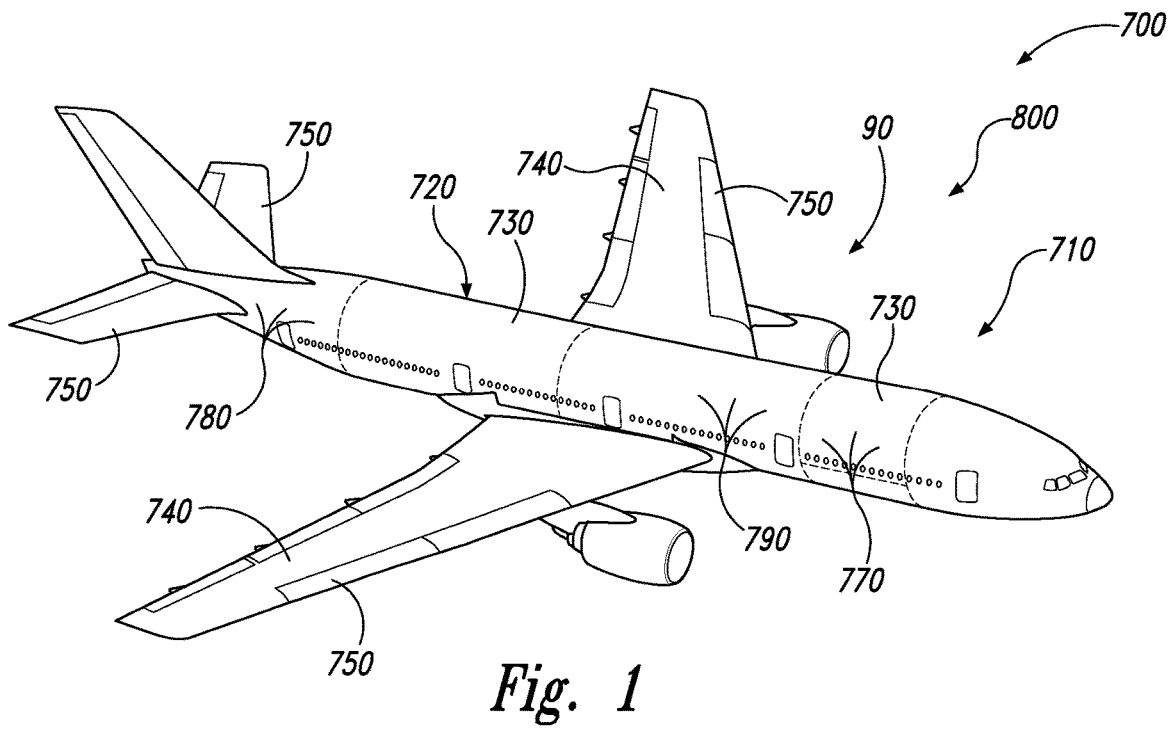
FIG. 1 is an example of an aircraft that includes a composite structure that may be produced using the systems and methods according to the present disclosure.

FIGS. 1-15 provide examples of composite structure fabrication systems 18, according to the present disclosure, of methods 300, according to the present disclosure, and/or of composite structures 800 and/or uncured composite structures 810 that may be produced and/or fabricated utilizing systems 18 and/or methods 300. Elements that serve a similar, or at least substantially similar, purpose are labeled with like numbers in each of FIGS. 1-15, and these elements may not be discussed in detail herein with reference to each of FIGS. 1-15. Similarly, all elements may not be labeled in each of FIGS. 1-15, but reference numerals associated therewith may be utilized herein for consistency. Elements, components, and/or features that are discussed herein with reference to one or more of FIGS. 1-15 may be included in and/or utilized with any of FIGS. 1-15 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 2:
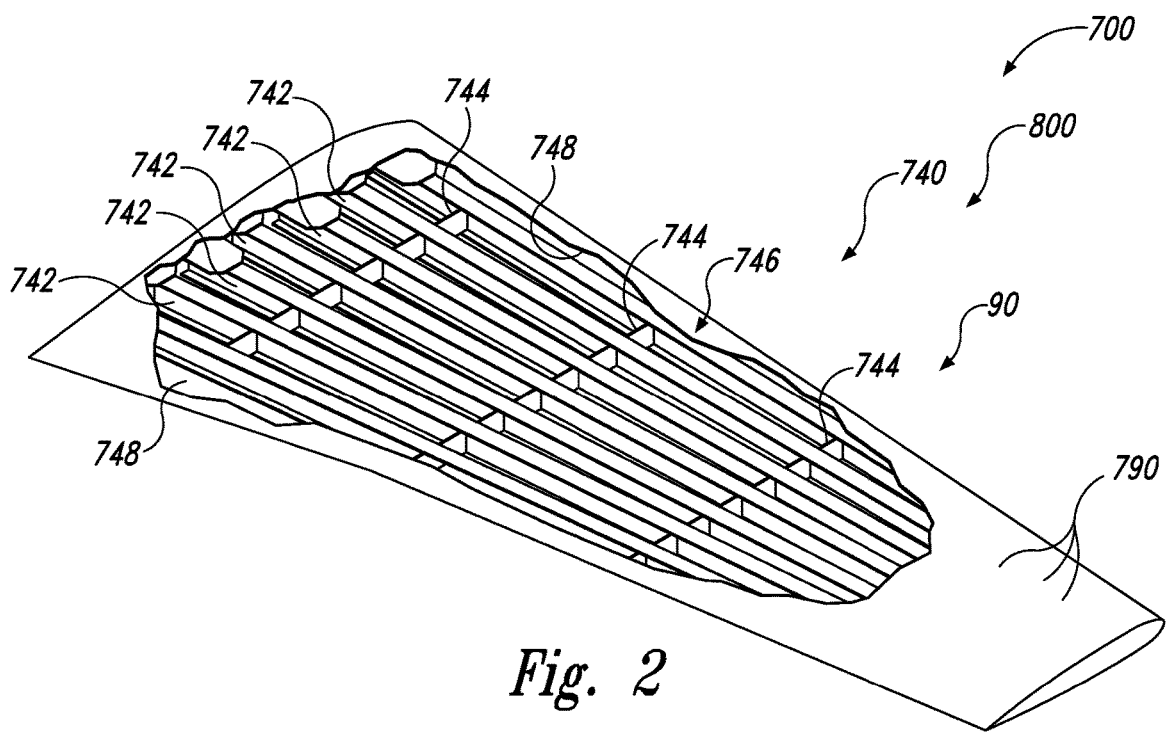
FIG. 2 is an example of a wing that may form a portion of the aircraft of FIG. 1.

FIG. 1 is an example of an aircraft 700 that includes a composite structure 800 that may be at least partially constructed utilizing systems 18 and/or methods 300, according to the present disclosure. FIG. 2 is an example of a wing 740 that may form a portion of aircraft 700. Aircraft 700 may include a plurality of components, including an airframe 710, a fuselage 720, a fuselage barrel 730, wing 740, and/or a stabilizer 750.

Composite structure 800 of aircraft 700 may include a plurality of plies 90 of composite material, which may form a portion of any suitable component of aircraft 700. As an example, and as illustrated in FIG. 1, aircraft 700 may include skin segments 790 that may form, cover, and/or be an outer surface of any suitable portion of aircraft 700 and/or a plurality of stringers 770 that, together with a plurality of frames 780, may support an inner surface of skin segments 790. As another example, and as illustrated in FIG. 2, wing 740 may include a plurality of wing stringers 742, which may extend along a length of the wing. Wing 740 also may include a plurality of ribs 744. Wing stringers 742 and ribs 744 together may form and/or define at least a portion of an inner support structure 746 for wing 740, which may support an inner surface 748 of skin segments 790 that cover wing 740. These skin segments also may be referred to herein as wing skin segments 790. It is within the scope of the present disclosure that skin segments 790 (or wing skin segments 790), stringers 770, frames 780, wing stringers 742, ribs 744, and/or inner support structure 746 may be at least partially, or even completely, produced from plies 90 of composite material.

Figure 3:
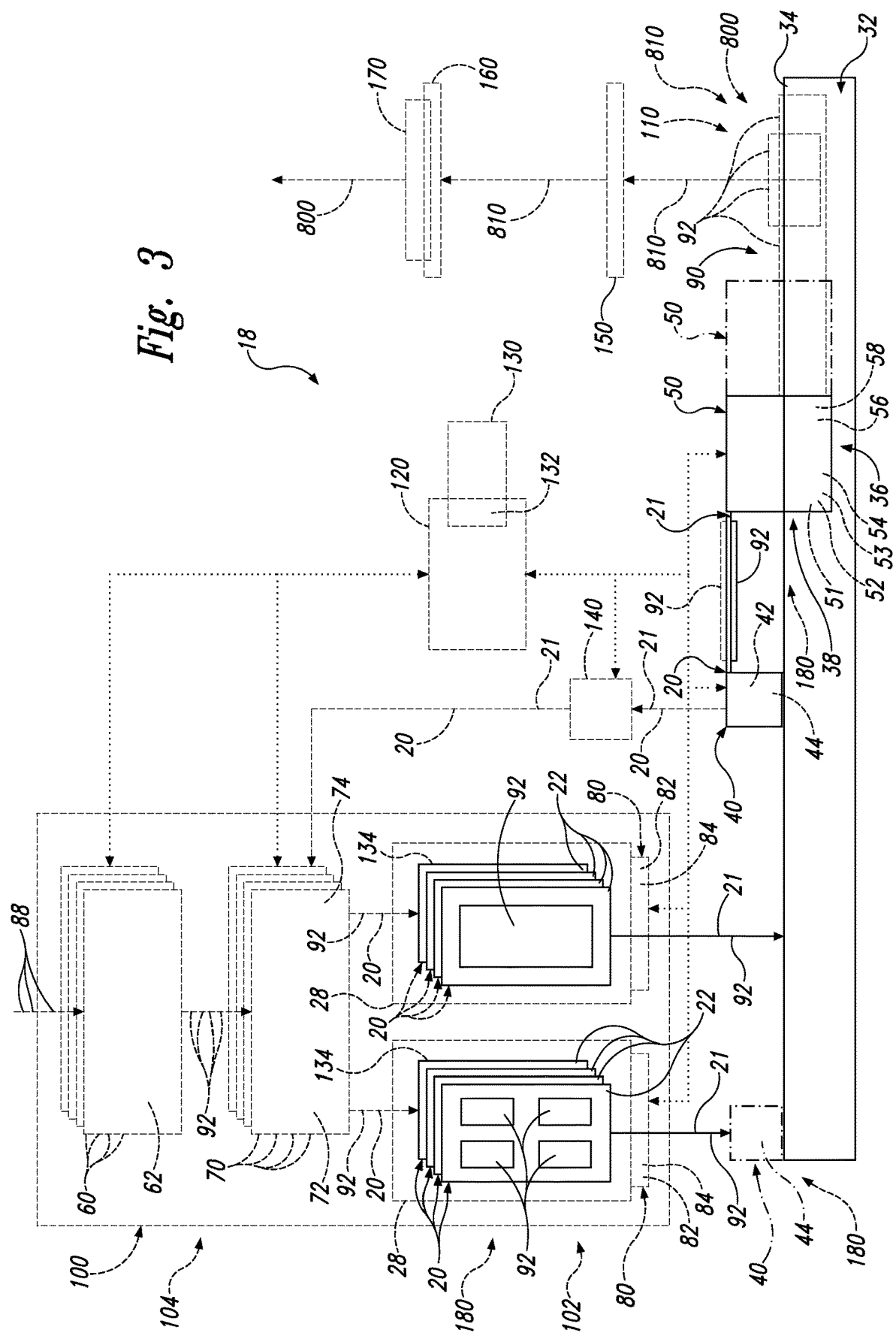
FIG. 3 is a schematic representation of a composite structure fabrication system according to the present disclosure.

FIG. 3 is a schematic representation of a composite structure fabrication system 18, according to the present disclosure. Composite structure fabrication system 18 also may be referred to herein as a fabrication system 18, an elongate composite structure fabrication system 18, and/or a system 18.

As illustrated in solid lines in FIG. 3, system 18 includes a plurality of ply carriers 20, an elongate forming mandrel 32, a carrier transfer device 40, and a forming machine 50. Each ply carrier 20 includes and/or defines a ply support surface 22, which is configured to at least temporarily support one or more ply segments 92. Ply segments 92 may be created from a composite material and may be laid-up, built-up, located, placed, and/or layered on elongate forming mandrel 32 to produce and/or define an uncured composite structure 810, which may be cured to produce a composite structure 800, as discussed in more detail herein. Elongate forming mandrel 32 may have and/or define an elongate ply forming surface 34. Elongate ply forming surface 34 is shaped to define a surface contour of composite structure 800 and is configured to receive and/or support a plurality of ply segments 92. System 18 optionally may include additional structures, components, and/or features and/or may perform additional functions, as discussed in more detail herein.

During operation of system 18, carrier transfer device 40 may be configured to selectively convey a selected ply carrier 21, together with one or more respective ply segments 92 that may be supported by selected ply carrier 21, from a ply kitting area 100 and/or from a ply carrier staging area 102 thereof to an intermediate location 180. As an example, intermediate location 180 may include and/or be a predetermined, preselected, and/or selected location 36 along the length of elongate forming mandrel 32. As another example, intermediate location 180 may include and/or be ply carrier staging area 102 and/or another ply carrier staging area that is spaced-apart from ply carrier staging area 102.

Forming machine 50 may be configured to receive selected ply carrier 21 from intermediate location 180 and/or from carrier transfer device 40 (directly and/or indirectly) and to deform selected ply carrier 21, together with the one or more respective ply segments 92, over a selected portion 38 of elongate ply forming surface 34. During this deformation process, the one or more respective ply segments 92 may be located between selected ply carrier 21 and selected portion 38 of elongate ply forming surface 34. Subsequently, forming machine 50 may separate selected ply carrier 21 from the respective ply segment 92 such that respective ply segment 92 is supported by selected portion 38 of elongate ply forming surface 34. Forming machine 50 then may return selected ply carrier 21 to carrier transfer device 40, which may return selected ply carrier 21 to ply carrier staging area 102.

The above-described process may be repeated any suitable number of times to locate any suitable number of ply segments 92 on elongate ply forming surface 34. As an example, forming machine 50 may be configured to translate along the length of elongate forming mandrel 32 and to receive and deform a plurality of selected ply carriers 21 and respective ply segments 92 and at a plurality of different selected locations 36 along the length of elongate forming mandrel 32. This is illustrated in FIG. 3 by forming machine 50 translating between a first selected location (with forming machine 50 illustrated in dash-dot lines) and a second selected location (with forming machine 50 illustrated in solid lines). Additionally or alternatively, the dash-dot lines in FIG. 3 may indicate that a single elongate forming mandrel 32 may have a plurality of forming machines 50 associated therewith.

This motion of forming machine 50 may permit ply segments 92 to be located and/or placed end-to-end along a length of elongate ply forming surface 34 to generate, create, and/or define a given ply 90, or layer 90, of uncured composite structure 810. Additionally or alternatively, ply segments 92 may be located and/or placed in an overlapping, stacked, or layered, fashion on elongate ply forming surface 34 to generate, create, and/or define a plurality of different, or layered, plies 90 of uncured composite structure 810.

As illustrated in dashed lines in FIG. 3, system 18 further may include a plurality of ply kitting tools 60. Ply kitting tools 60 may be adapted, configured, designed, and/or constructed to create ply segments 92, such as by cutting ply segments 92 from a composite feedstock 88 of composite material. Ply kitting tools 60 may be automated. As such, ply kitting tools 60 also may be referred to herein as automated ply kitting tools 60 and/or as numerically controlled ply kitting tools 60. As an example, ply kitting tools 60 may include and/or be a plurality of ply kitting robots 62.

As discussed in more detail herein, ply segments 92 may have and/or define a plurality of different configurations. As examples, different ply segments 92 may be shaped to be received on a specific and/or predetermined portion of elongate ply forming surface 34 and/or may be shaped to define a specific portion of uncured composite structure 810. As such, different ply segments 92 may have and/or define different shapes, compositions, and/or different fiber orientations and/or may be created from different composite feedstocks 88.

At a given point in time, each ply kitting tool 60 may be adapted, configured, and/or programmed to create and/or define a respective ply segment 92, such as may have a given, or predetermined, shape, composition, and/or fiber orientation. In addition, each ply kitting tool 60 may be adapted, configured, and/or programmed to operate independently from a remainder of the ply kitting tools 60. Furthermore, ply kitting tools 60 may be configured to operate, or to create respective ply segments 92, at least partially concurrently with one another. As such, ply segments 92 that are concurrently created and/or defined by ply kitting tools 60 may have and/or define a plurality of different configurations, and systems 18 may be configured to track a location of, or maintain an inventory of, individual ply segments 92, as discussed in more detail herein.

As also illustrated in dashed lines in FIG. 3, system 18 further may include a plurality of ply segment locating devices 70. Ply segment locating devices 70 may be configured to locate at least one ply segment 92 on each ply carrier 20. It is within the scope of the present disclosure that a given ply segment locating device 70 may be separate and/or distinct from a corresponding ply kitting tool 60. However, it is also within the scope of the present disclosure that the given ply segment locating device 70 may form a portion of the corresponding ply kitting tool 60. Ply segment locating device 70 may locate and/or place ply segments 92 on ply carriers 20 subsequent to creation of ply segments 92 by ply kitting tools 60. Additionally or alternatively, ply segment locating device 70 may locate and/or place composite feedstock 88 on ply carriers 20, with composite feedstock 88 subsequently being modified to create one or more ply segments 92 by ply kitting tool 60.

Ply segment locating device 70 may be automated. As such, ply segment locating device 70 also may be referred to herein as automated ply segment locating device 70 and/or as numerically controlled ply segment locating device 70. As an example, ply segment locating device 70 may include and/or be a ply locating robot 72.

Ply segment locating device 70 may be configured to vacuum compact ply segments 92 onto corresponding ply carriers 20. As such, ply segment locating device 70 may include and/or be associated with a segment vacuum compaction structure 74.

It is within the scope of the present disclosure that a given ply segment locating device 70 may be configured to locate any suitable number of ply segments 92 on a given ply carrier 20. As an example, the given ply segment locating device may be configured to locate a single ply segment 92 on the given ply carrier 20. As another example, the given ply segment locating device may be configured to locate at least two ply segments 92 on the given ply carrier 20.

When the given ply segment locating device 70 locates two or more ply segments 92 on the given ply carrier 20, the two or more ply segments 92 may be located in any suitable manner. As an example, the two or more ply segments 92 may be located such that they define a plurality of stacked ply segments 92. As another example, the two or more ply segments 92 may be located in a spaced-apart manner on the given ply carrier 20. As yet another example, a first fiber orientation of a first ply segment 92 that is supported by the given ply carrier 20 may be different from a second fiber orientation of a second ply segment 92 that is supported by the given ply carrier 20.

As further illustrated in dashed lines in FIG. 3, system 18 may include a plurality of ply carrier magazines 28. Each ply carrier magazine 28 may be configured to contain, house, enclose, and/or otherwise support a respective plurality of ply carriers 20 and corresponding ply segment(s) 92 that may be supported thereby. As examples, each ply carrier magazine 20 may be configured to contain at least 2, at least 3, at least 4, at least 5, at least 6, at least 7, at least 8, or at least 10 ply carriers 20.

Ply carrier magazines 28 may support ply carriers 20 in any suitable manner. As an example, ply carrier magazines 20 may include a plurality of slots. The plurality of slots may be configured to receive and/or support the respective plurality of ply carriers 20 in a spaced-apart manner.

Ply carrier magazines 28 also may be configured to protect the respective plurality of ply carriers 20 from contamination, from an ambient environment, and/or from particulate matter. In addition, ply carrier magazines 28 may be configured to retain the respective plurality of ply carriers 20 in a vertical, or at least substantially vertical, orientation; however, this is not required, and ply carrier magazines 28 additionally or alternatively may be configured to retain the respective plurality of ply carriers 20 in a horizontal, or at least substantially horizontal, orientation. While not required, such a vertical orientation may decrease a floor space needed by ply carrier magazines 28, thereby increasing a spatial efficiency of systems 18.

As also illustrated in dashed lines in FIG. 3, system 18 may include a magazine transfer device 80. Magazine transfer device 80 may be configured to selectively convey ply carrier magazines 28 within ply kitting area 100 and/or between a kitting tool area 104 and ply carrier staging area 102, as discussed in more detail herein. Magazine transfer device 80 may be automated. As such, magazine transfer device 80 also may be referred to herein as automated magazine transfer device 80. As more specific examples, magazine transfer device 80 may include and/or be an automated guided vehicle 82 and/or a magazine transfer robot 84.

As further illustrated in dashed lines in FIG. 3, system 18 may be, but is not required to be, separated into ply kitting area 100 and a ply assembly area 110. Ply kitting area 100 may include, contain, and/or house ply carrier magazine(s) 28, ply kitting tool(s) 60, ply segment locating device(s) 70, and/or magazine transfer device(s) 80. Ply assembly area 110 may include, contain, and/or house one or more elongate forming mandrels 32, one or more carrier transfer devices 40, and/or one or more forming machines 50. In addition, carrier transfer device 40 may be configured to obtain selected ply carrier 21 from ply kitting area 100 and/or to transfer selected ply carrier 21 from ply kitting area 100 to ply assembly area 110.

It is within the scope of the present disclosure that ply kitting area 100 and ply assembly area 110 may be located on the same floor, or level, or on different floors, or levels. As an example, ply kitting area 100 may be elevated above ply assembly area 110. Alternatively, ply assembly area 110 may be elevated above ply kitting area 100. Stated another way, ply kitting area 100 and ply assembly area 110 may be spaced-apart from one another, at least in a vertical direction. However, ply kitting area 100 may at least partially, or even completely, overlap with ply assembly area 110 in a horizontal direction. Such a configuration may decrease an amount of overall floor, or building, space required to house system 18. However, such a configuration is not required in all embodiments. Thus, ply kitting area 100 and ply assembly area 110 alternatively may be spaced-apart from one another in the horizontal direction but not in the vertical direction. Alternatively, ply kitting area 100 and ply assembly area 110 may be at least partially overlapping and/or coextensive.

When ply kitting area 100 and ply assembly area 110 are located on different floors, or levels, carrier transfer device 40 may be configured to vertically convey selected ply carrier 21 from ply kitting area 100 to ply assembly area 110. This may include conveying selected ply carrier 21 while selected ply carrier 21 is in a vertical orientation and/or while selected ply carrier 21 is in a horizontal orientation. When the selected ply carrier is conveyed in the vertical orientation, and as illustrated, system 18 may be configured to transition selected ply carrier 21 to a horizontal orientation prior to selected ply carrier 21 being received and/or deformed by forming machine 50. As such, carrier transfer device 40 further may include a pivot structure 42, which may be configured to selectively rotate selected ply carrier 21 from the vertical orientation to a horizontal orientation prior to receipt of selected ply carrier 21 by forming machine 50.

As also illustrated in FIG. 3, selected ply carrier 21 may support ply segments 92 on two or more sides of the selected ply carrier. Under these conditions, pivot structure 42 further may be configured to selectively rotate selected ply carrier 21 about a horizontal axis and/or to rotate selected ply carrier 21 such that the two or more sides thereof may face toward elongate forming mandrel 32 and/or such that ply segments that are supported on the two more sides of selected ply carrier 21 may be deformed against elongate forming mandrel 32.

As discussed, one or more components of system 18 may be automated and/or numerically controlled. With this in mind, and as illustrated in dashed lines in FIG. 3, system 18 further may include, be associated with, and/or be in communication with a controller 120. Controller 120 may be adapted, configured, and/or programmed to control the operation of at least a portion of system 18. This may include controlling the operation of system 18 by performing any suitable portion of methods 300, which are discussed in more detail herein with reference to FIG. 15. As examples, controller 120 may be programmed to control and/or regulate the operation of carrier transfer device 40, forming machine 50, ply kitting tool 60, ply segment locating device 70, magazine transfer device 80, and/or a wash station 140.

As also discussed, ply segments 92 may include, define, and/or have a variety of different configurations. Under these conditions, controller 120 may be programmed to select a given ply carrier 20 for transfer to intermediate location 180 and/or to selected location 36 based, at least in part, on a structure and/or configuration of a ply segment 92 that is supported by given ply carrier 20 and/or based, at least in part, on selected location 36. As an example, controller 120 may select the given ply carrier 20 such that a ply segment 92 with a predetermined, preselected, and/or specified configuration is located at each respective location along the length of elongate forming mandrel 32 and/or at each respective location within uncured composite structure 810.

As also illustrated in dashed lines in FIG. 3, system 18 may include a ply carrier tracking system 130. Ply carrier tracking system 130 may be configured to automatically, routinely, and/or electronically track a location of each ply carrier 20 and/or of each ply segment 92 that may be included in, associated with, utilized by, and/or transferred with system 18. In addition, ply carrier tracking system 130 also may be configured to track a structure, conformation, and/or configuration of each ply segment 92 that is supported by a ply carrier 20.

Ply carrier tracking system 130 may track ply carriers 20 and/or ply segments 92 in any suitable manner. As an example, ply carrier tracking system 130 may include a unique identification structure 134 that may be associated with, attached to, and/or defined by each ply carrier 20. Examples of unique identification structure 134 include any suitable bar code and/or radio frequency identification (RFID) tag.

FIG. 3 illustrates ply carrier tracking system 130 in a partially overlapping relationship with controller 120 to indicate that ply carrier tracking system 130 may be included in and/or may form a portion of controller 120. However, it is also within the scope of the present disclosure that ply carrier tracking system 130 may be separate, distinct, and/or spaced apart from controller 120. Under these conditions, system 18 further may include a communication linkage 132 that may extend and/or permit communication between controller 120 and ply carrier tracking system 130.

As illustrated in dashed lines in FIG. 3, system 18 also may include an uncured composite transfer device 150. Uncured composite transfer device 150 may be configured to selectively remove uncured composite structure 810 from elongate ply forming surface 34 of elongate forming mandrel 32. This may include removal of the plurality of ply segments 92, which defines uncured composite structure 810, from the elongate ply forming surface. Examples of uncured composite transfer device 150 are disclosed in U.S. patent application Ser. No. 14/633,979, the complete disclosure of which is hereby incorporated by reference.

As further illustrated in dashed lines in FIG. 3, system 18 may include a cure mandrel 160. Uncured composite transfer device 150 may be configured to transfer and/or convey uncured composite structure 810 from elongate forming mandrel 32 to cure mandrel 160, such as to permit and/or facilitate curing of uncured composite structure 810 to at least partially produce and/or define composite structure 800. However, this is not required in all embodiments. As an example, system 18 may be configured to cure uncured composite structure 810 on elongate forming mandrel 32.

Cure mandrel 160, when present, may be configured to receive uncured composite structure 810 from uncured composite transfer device 150, and it is within the scope of the present disclosure that cure mandrel 160 also may be configured to receive one or more additional and/or separate uncured composite structures 810. Under these conditions, a plurality of separate uncured composite structures 810 may be utilized to produce and/or define composite structure 800 subsequent to curing of the separate uncured composite structures on cure mandrel 160.

System 18 also may include a heating device 170. Heating device 170 may be associated with elongate forming mandrel 32, may be associated with cure mandrel 160, and/or may be configured to heat uncured composite structure 810 to cure uncured composite structure 810 and produce composite structure 800. This may include heating uncured composite structure 810 while uncured composite structure 810 is located on and/or supported by elongate forming mandrel 32 and/or by cure mandrel 160.

As discussed in more detail herein, systems 18 may be configured to re-use ply carriers 20, such as to locate a first ply segment 92 on a given ply carrier 20, to deform the given ply carrier 20 and the first ply segment 92 on elongate forming mandrel 32 with forming machine 50, and subsequently to locate a second ply segment 92 on the given ply carrier 20. Under these conditions, it may be desirable to clean and/or wash ply carriers 20 prior to re-use thereof. With this in mind, system 18 also may include a wash station 140. Wash station 140 may be configured to receive ply carriers 20 subsequent to a respective ply segment 92 being removed therefrom. In addition, wash station 140 may be configured to selectively clean ply carriers 20, such as to facilitate subsequent re-use of ply carriers 20.

Ply carriers 20 then may be returned to ply kitting area 100, to ply carrier staging area 102, to kitting tool area 104, and/or to ply segment locating device 70, such as to permit ply segment locating device 70 to locate another ply segment 92 on the ply carriers 20. It is within the scope of the present disclosure that system 18 may not include wash station 140 and/or that ply carriers 20 may be returned to ply segment locating device 70 without being washed by wash station 140.

Ply carriers 20 may include and/or be any suitable structure that may define ply support surface 22 and/or that may support one or more ply segments 92. Ply carriers 20 and/or ply support surface 22 thereof may include and/or be constructed from any suitable structure and/or material. As examples, ply carrier 20 and/or ply support surface thereof may be constructed from an elastic material, a flexible material, and/or a latex sheet. As an additional example, ply carriers 20 also may include a rigid, or at least substantially rigid, elongate support that extends along a length of ply carriers 20. Examples of ply carriers 20 are disclosed in U.S. Pat. No. 8,551,380 and U.S. Patent Application Publication No. 2014/0190625, the complete disclosures of which are hereby incorporated by reference.

Elongate forming mandrel 32 may include and/or be any suitable structure that may have and/or define elongate ply forming surface 34 and/or that may support ply segments 92 and/or uncured composite structure 810 that may be defined thereby. As discussed, a plurality of ply segments 92 may be spaced-apart along the length of elongate forming mandrel 32 to define a given ply 90 of uncured composite structure 810. As such, a length of elongate ply forming surface 34 may be greater than a length of any one of the plurality of ply segments 92 that may be supported thereby. As examples, the length of elongate ply forming surface 34 may be at least 4, at least 6, at least 8, at least 10, at least 15, or at least 20 times larger than the length of any one, or even a longest, of the plurality of ply segments 92. Additionally or alternatively, elongate ply forming surface 34 may have and/or define a length of at least 5 meters, at least 10 meters, at least 15 meters, at least 20 meters, at least 25 meters, at least 30 meters, at least 35 meters, or at least 40 meters.

When ply segments 92 are spaced-apart along the length of elongate forming mandrel 32, adjacent ply segments 92 may abut one another in any suitable fashion. As an example, the adjacent ply segments 92 may define a butt splice therebetween. As another example, the adjacent ply segments 92 may define an overlap splice therebetween.

Elongate ply forming surface 34 also may have and/or define any suitable shape. As an example, elongate ply forming surface 34 may define a nonplanar shape. Under these conditions, elongate ply forming surface 34 also may be referred to herein as a nonplanar elongate ply forming surface 34. As a more specific example, elongate ply forming surface 34 may be shaped to define a surface contour of a stringer for an aircraft. This may include any suitable blade stringer, hat stringer, and/or vent stringer for the aircraft and/or for a wing of the aircraft.

Carrier transfer device 40 may include and/or be any suitable structure that may be adapted and/or configured to selectively convey selected ply carrier 21 from ply carrier staging area 102 to selected location 36 along the length of elongate forming mandrel 32, that may be adapted and/or configured to remove selected ply carrier 21 from ply carrier magazine 28, and/or that may be adapted and/or configured to return selected ply carrier 21 to ply carrier magazine 28, wash station 140, and/or ply kitting area 100. This is illustrated in FIG. 3 by carrier transfer device 40 being indicated in dash-dot lines at a first location along the length of elongate forming mandrel 32 and being indicated in solid lines at selected location 36.

Carrier transfer device 40 may be controlled by controller 120. Under these conditions, carrier transfer device 40 also may be referred to herein as an automated carrier transfer device 40 and/or as a numerically controlled carrier transfer device 40. Additionally or alternatively, carrier transfer device 40 may include and/or be a carrier transfer robot 44.

As discussed, carrier transfer device 40 may be adapted, configured, designed, constructed, and/or programmed to selectively and sequentially convey a plurality of different selected ply carriers 21. This may include conveying the plurality of different selected ply carriers to intermediate location 180 and/or to a plurality of different selected locations 36 along the length of elongate forming mandrel 32. This also may include horizontally conveying selected ply carrier 21 along the length of elongate forming mandrel 32. Forming machine 50 may be configured to selectively and sequentially receive the plurality of selected ply carriers and to deform each of the plurality of selected ply carriers at respective locations along the length of elongate forming mandrel 32, thereby defining plies 90 and/or uncured composite structure 810.

It is within the scope of the present disclosure that carrier transfer device 40 may be configured to transition to a staging location subsequent to receipt of selected ply carrier 21 by forming machine 50 and prior to return of the selected ply carrier from the forming machine to the carrier transfer device. It is also within the scope of the present disclosure that carrier transfer device 40 may be configured to return selected ply carrier 21 to ply carrier magazine 28 subsequent to return of selected ply carrier 21 from forming machine 50 to carrier transfer device 40.

Forming machine 50 may include any suitable structure that may be adapted, configured, designed, constructed, and/or programmed to deform selected ply carrier 21 and respective ply segment 92, to separate the selected ply carrier from the respective ply segment, and/or to return the selected ply carrier to carrier transfer device 40. This may include deforming the selected ply carrier and the respective ply segment with a deformation device 51, which may form a portion of forming machine 50, and/or separating the selected ply carrier from the respective ply segment with a ply release structure 53, which may form a portion of forming machine 50.

Forming machine 50 may be automated. As such, forming machine 50 also may be referred to herein as an automated forming machine 50 and/or as a numerically controlled forming machine 50. As an example, forming machine 50 may include and/or be a forming robot 52.

Forming machine 50 may be configured to deform selected ply carrier 21 and respective ply segment 92 in a direction that is transverse to a longitudinal axis of elongate ply forming surface 34. This may include wrapping selected ply carrier 21 and respective ply segment 92 around elongate ply forming surface 34.

As discussed, forming machine 50 may be configured to translate along the length of elongate forming mandrel 32. To facilitate this translation, forming machine 50 may include a forming machine translation device 54. Forming machine translation device 54 may include any suitable structure, such as a motor and/or a linear actuator, that may be configured to selectively translate forming machine 50 along the length of elongate forming mandrel 32.

Forming machine 50 also may include a forming machine compaction device 56. Forming machine compaction device 56 may be configured to compact the respective ply segment 92 on selected portion 38 of elongate ply forming surface 34.

As discussed, forming machine 50 may be configured to receive selected ply carrier 21 from carrier transfer device 40. As such, forming machine 50 may include an end effector 58 that may be configured to operatively receive, retain, and/or support selected ply carrier 21.

Ply segments 92 may include and/or be any suitable structure and/or material that may at least partially define plies 90, uncured composite structure 810, and/or composite structure 800. As examples, one or more ply segments 92 may include one or more of a fiberglass, a fiberglass cloth, a carbon fiber, a carbon fiber cloth, a cloth, a pre-impregnated (pre-preg) composite material, a resin material, and/or an epoxy.

FIGS. 4-14 are less schematic representations of composite structure fabrication systems 18 according to the present disclosure. Systems 18 of FIGS. 4-14 may include and/or be more detailed representations of systems 18 of FIG. 3. As such, any of the structures, functions, components, and/or features of systems 18 that are discussed herein with reference to any one of FIGS. 4-14 may be included in and/or utilized with systems 18 of FIG. 3 without departing from the scope of the present disclosure. Similarly, any of the structures, functions, components, and/or features of systems 18 of FIG. 3 may be included in and/or utilized with systems 18 of FIGS. 4-14 without departing from the scope of the present disclosure.

Figure 4:
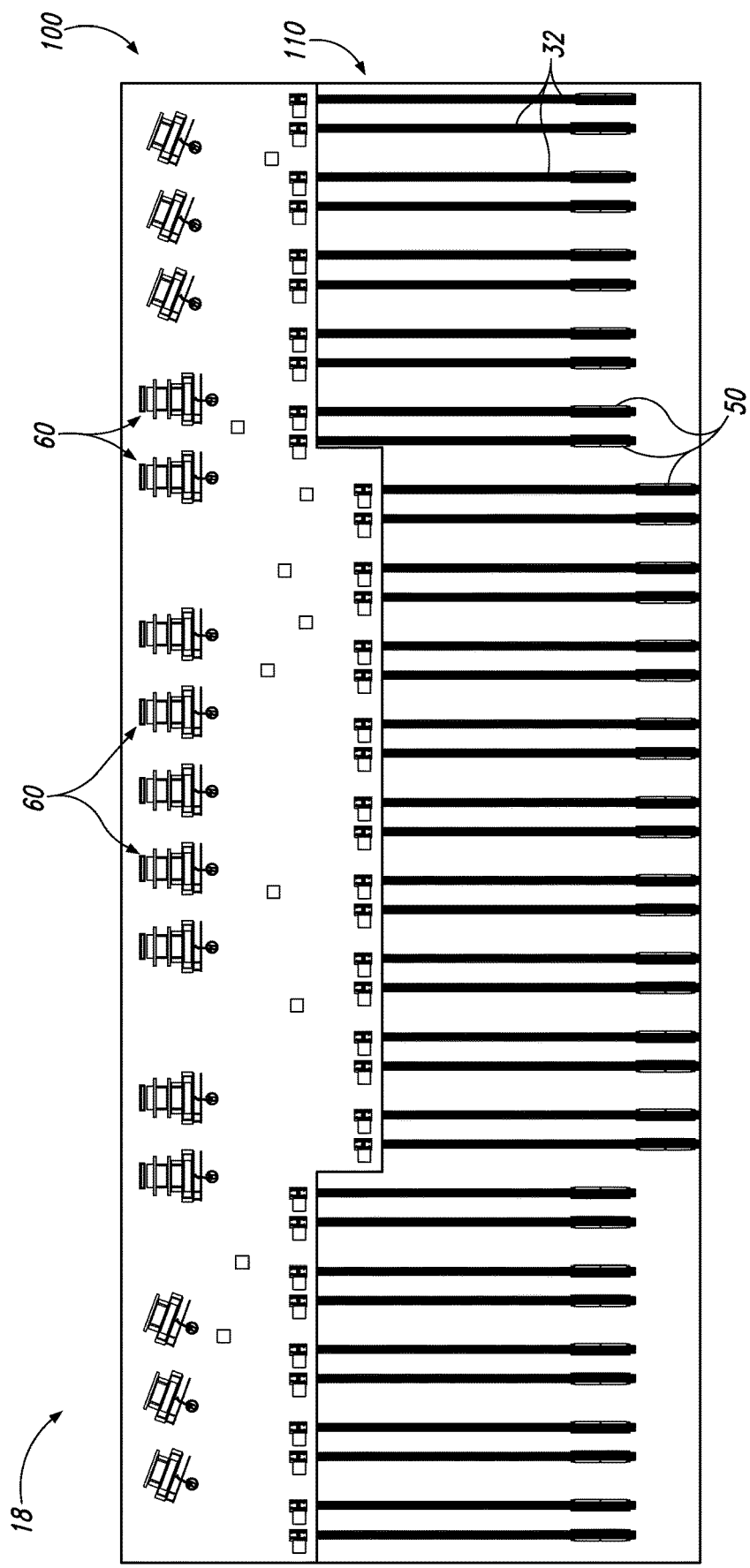
FIG. 4 is a less schematic top view of a composite structure fabrication system according to the present disclosure.
Figure 5:
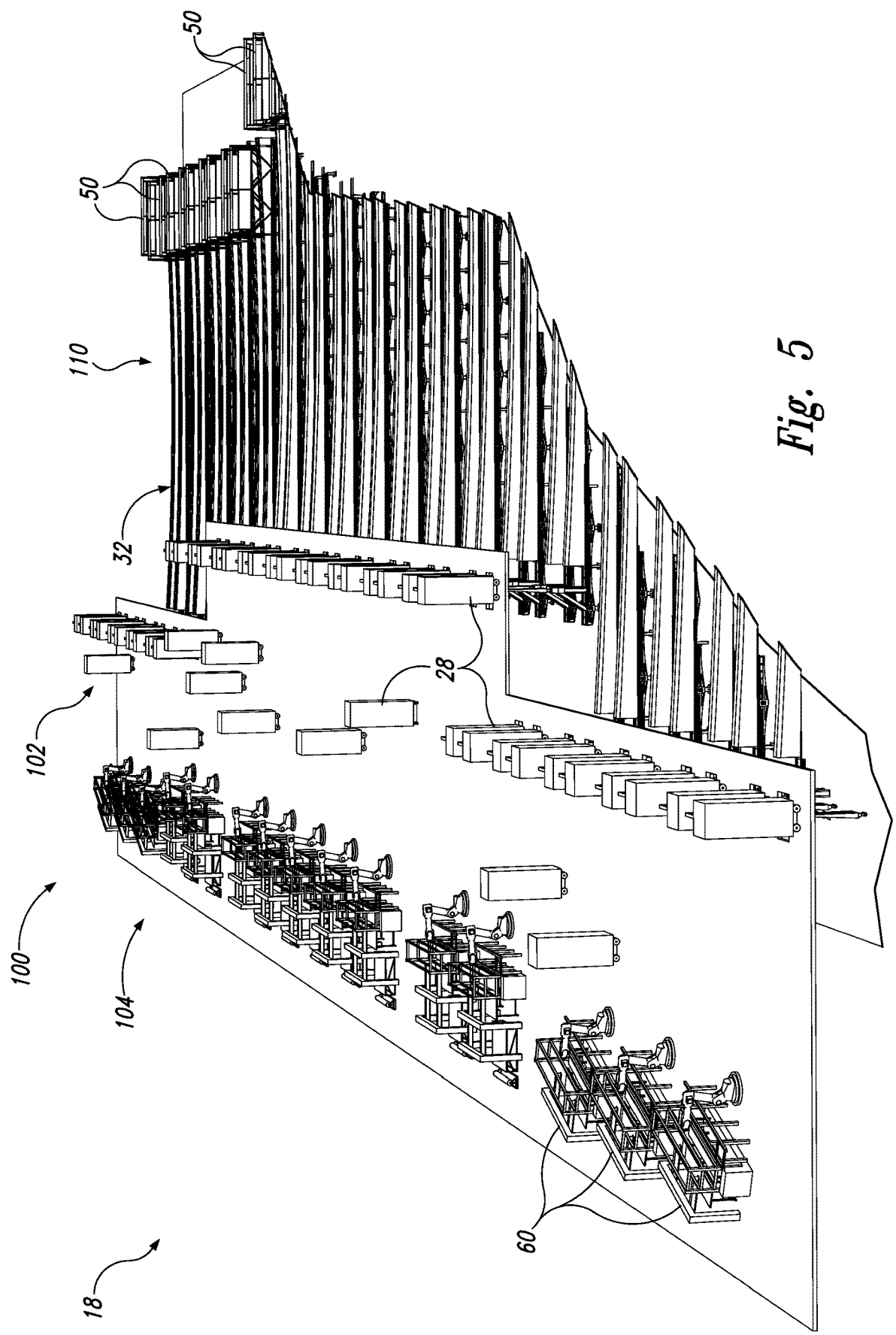
FIG. 5 is a less schematic profile view of a composite structure fabrication system according to the present disclosure.

FIG. 4 is a less schematic top view of a composite structure fabrication system 18 according to the present disclosure, and FIG. 5 is a less schematic profile view of composite structure fabrication system 18. As illustrated in FIGS. 4-5, system 18 may include a plurality of elongate forming mandrels 32 and a plurality of associated forming machines 50 that may be arranged within a ply assembly area 110.

As discussed herein, forming machines 50 may be configured to move and/or translate along a length of elongate forming mandrels 32, and this is illustrated in FIGS. 4-5 by forming machines 50 being located at differing locations along the length of respective forming mandrels 32. As also illustrated in FIGS. 4-5, system 18 further may include a plurality of ply kitting tools 60 that may be arranged within a ply kitting area 100. Ply kitting area 100 also may include a plurality of ply carrier magazines 28.

Figure 6:
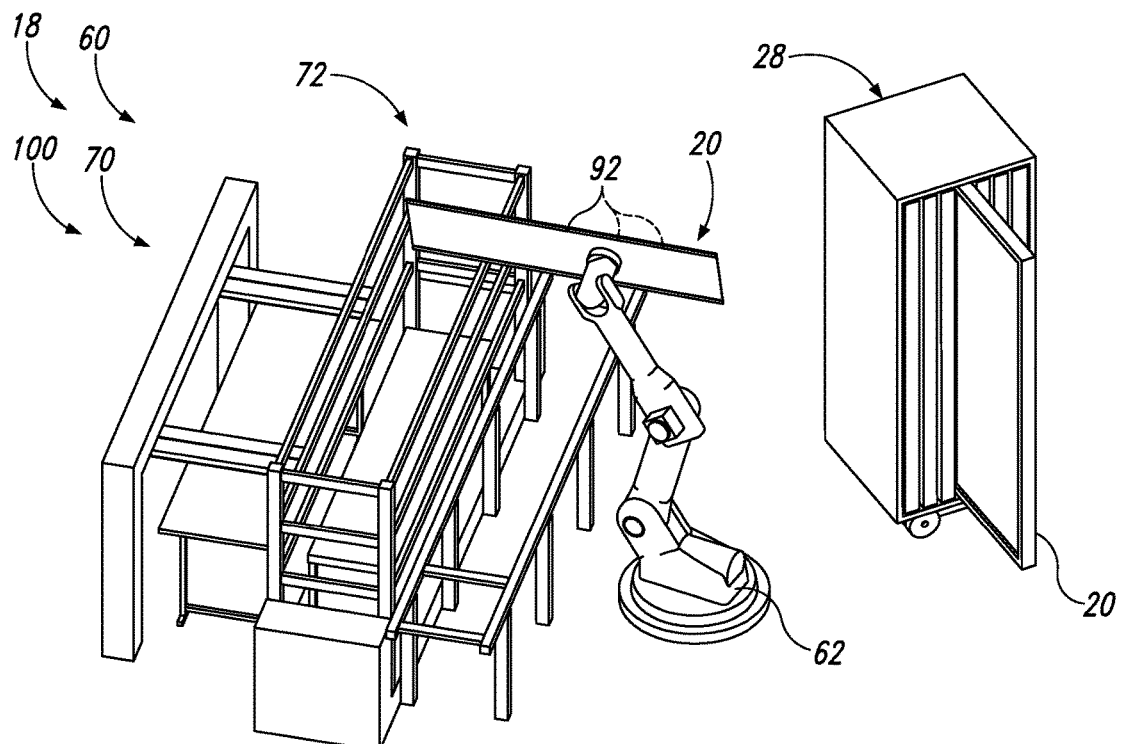
FIG. 6 is a less schematic view of a portion of a ply kitting area according to the present disclosure.
Figure 7:
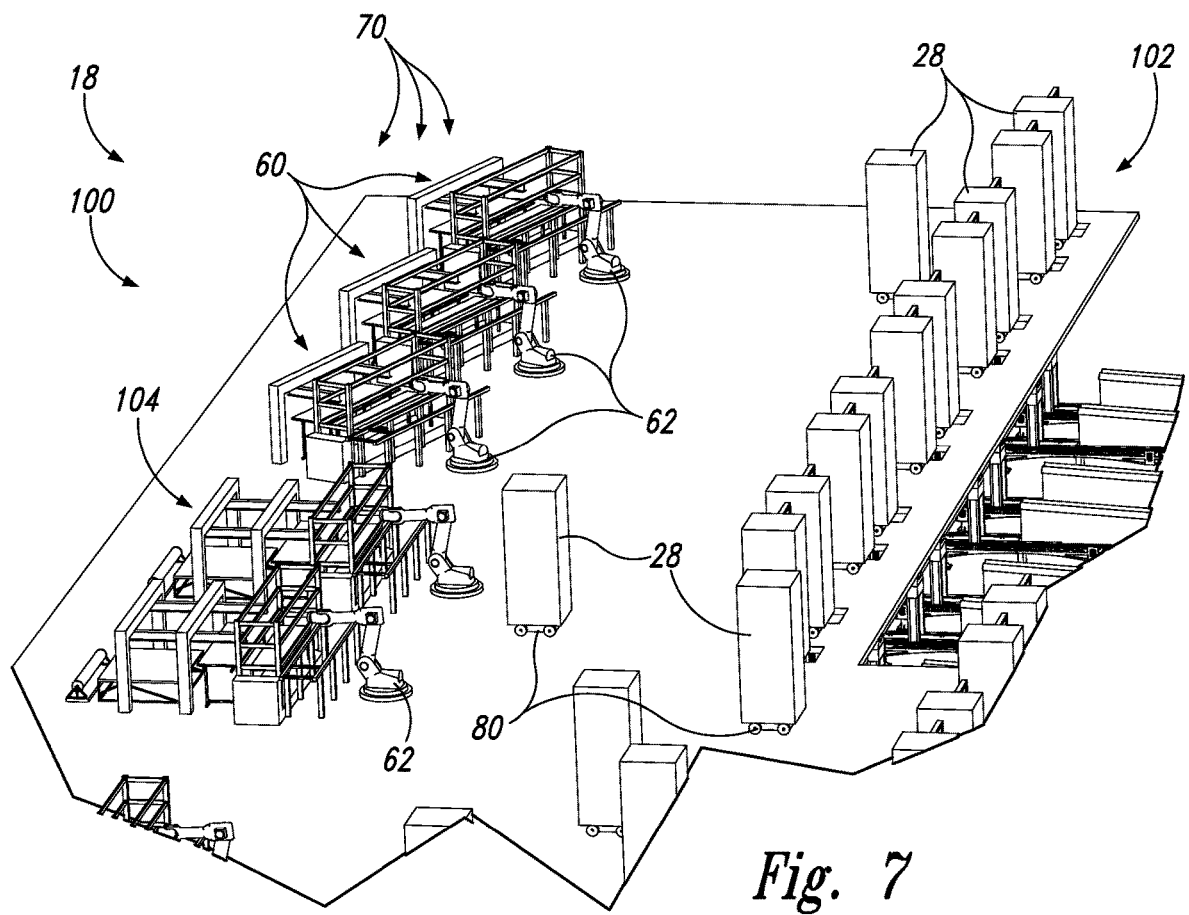
FIG. 7 is a less schematic view of a portion of a ply kitting area according to the present disclosure.
Figure 8:
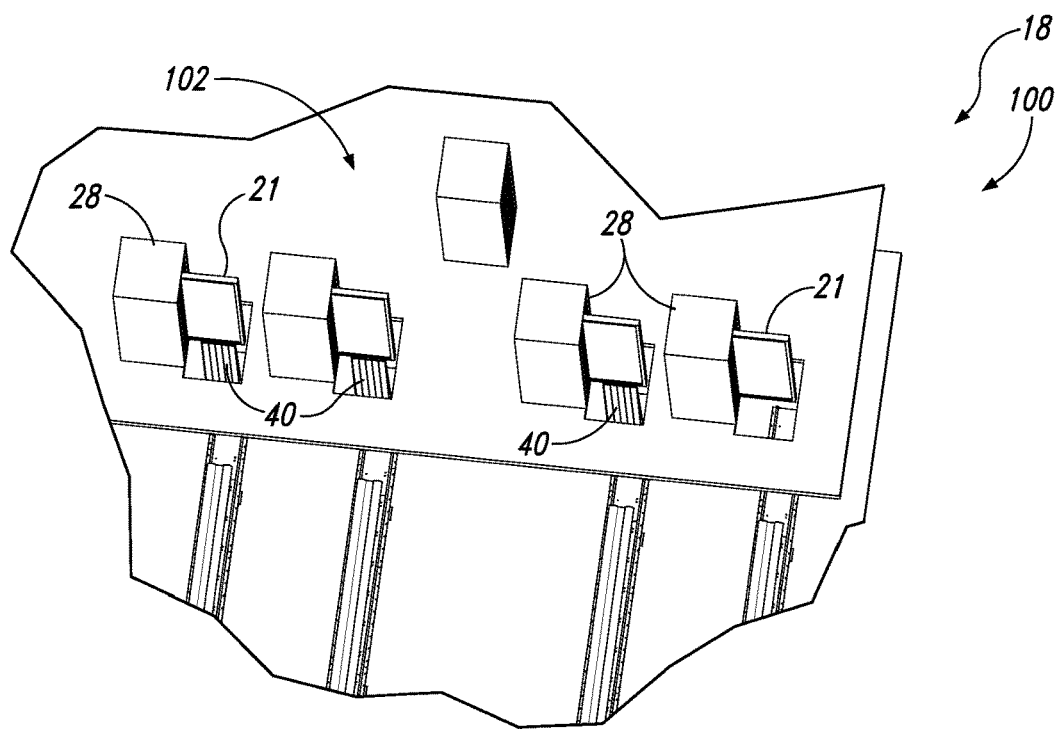
FIG. 8 is a less schematic view of a portion of a ply kitting area according to the present disclosure.

FIGS. 6-8 are less schematic views of portions of a ply kitting area 100 according to the present disclosure. As illustrated in FIG. 6, a ply kitting tool 60 may include a ply kitting robot 62 that may be configured to receive a ply carrier 20 that has one or more ply segments 92 located thereon. Ply kitting robot 62 also may locate ply carriers 20 within a ply carrier magazine 28 for storage and/or staging of ply carriers 20.

As further illustrated in FIG. 6, ply kitting tools 60 also may include and/or be associated with a ply segment locating device 70, which may be configured to operatively located ply segments 92 on respective ply carriers 20. As discussed, ply segment locating device 70 may be separate and/or distinct from ply kitting tool 60. Alternatively, ply segment locating device 70 may form a portion of ply kitting tool 60 and/or ply kitting robot 62.

FIG. 7 illustrates more clearly that a plurality of ply carrier magazines 28 may be located and/or staged within ply kitting area 100, or within a ply carrier staging area 102 thereof. This may permit a selected, given, and/or predetermined ply segment 92 to be conveyed to a respective forming machine 50 on a respective elongate forming mandrel 32 (as illustrated in FIGS. 4-5). FIG. 7 also illustrates that ply carrier magazines 28 may include, be operatively attached to, and/or be associated with respective magazine transfer devices 80.

Figure 9:
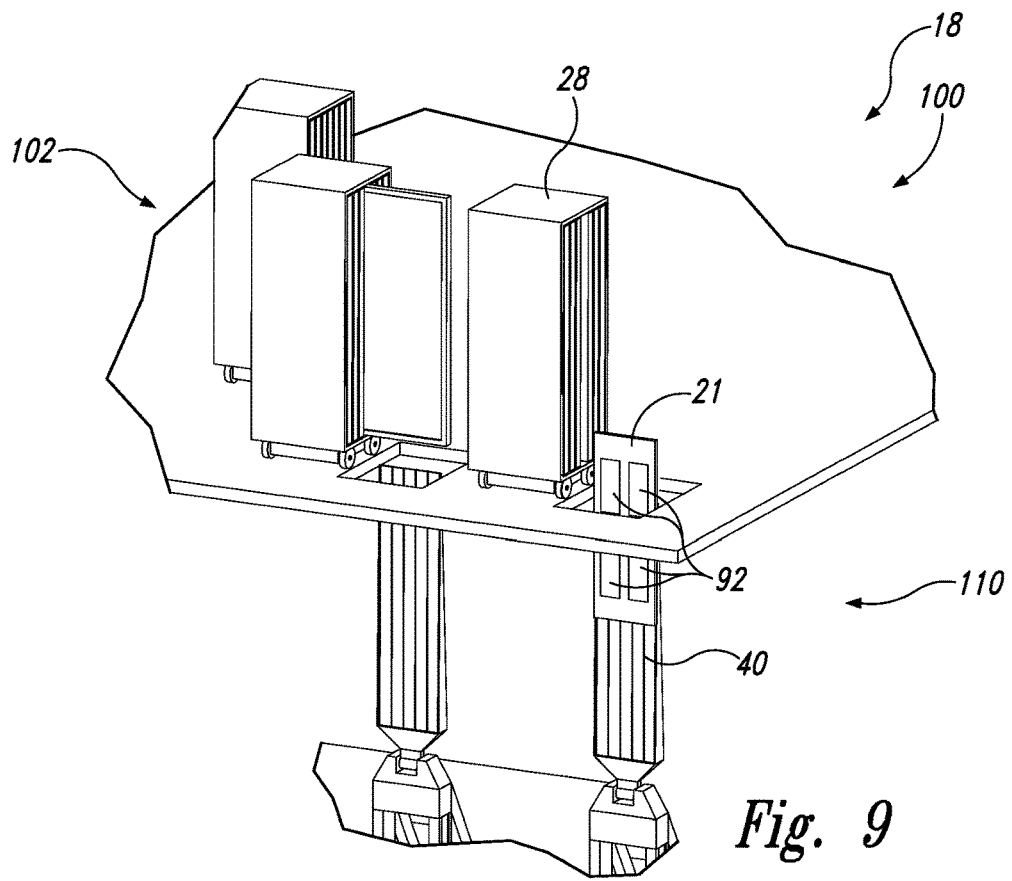
FIG. 9 is a less schematic view of a carrier transfer device receiving a ply carrier from a ply carrier magazine, according to the present disclosure.

As illustrated in FIG. 8, ply carrier magazines 28 may be located and/or staged within ply carrier staging area 102 of ply kitting area 100 such that a carrier transfer device 40 may receive and/or remove a selected ply carrier 21 from a given ply carrier magazine 28. Carrier transfer device 40 then may convey selected ply carrier 21, together with corresponding ply segments 92, from ply carrier staging area 102 of ply kitting area 100 to ply assembly area 110, as illustrated in FIG. 9. This may include conveying selected ply carrier 21 in a vertical direction and/or maintaining selected ply carrier 21 in a vertical, or upright, orientation 46 (as illustrated in FIG. 10) while it is conveyed.

Figure 10:
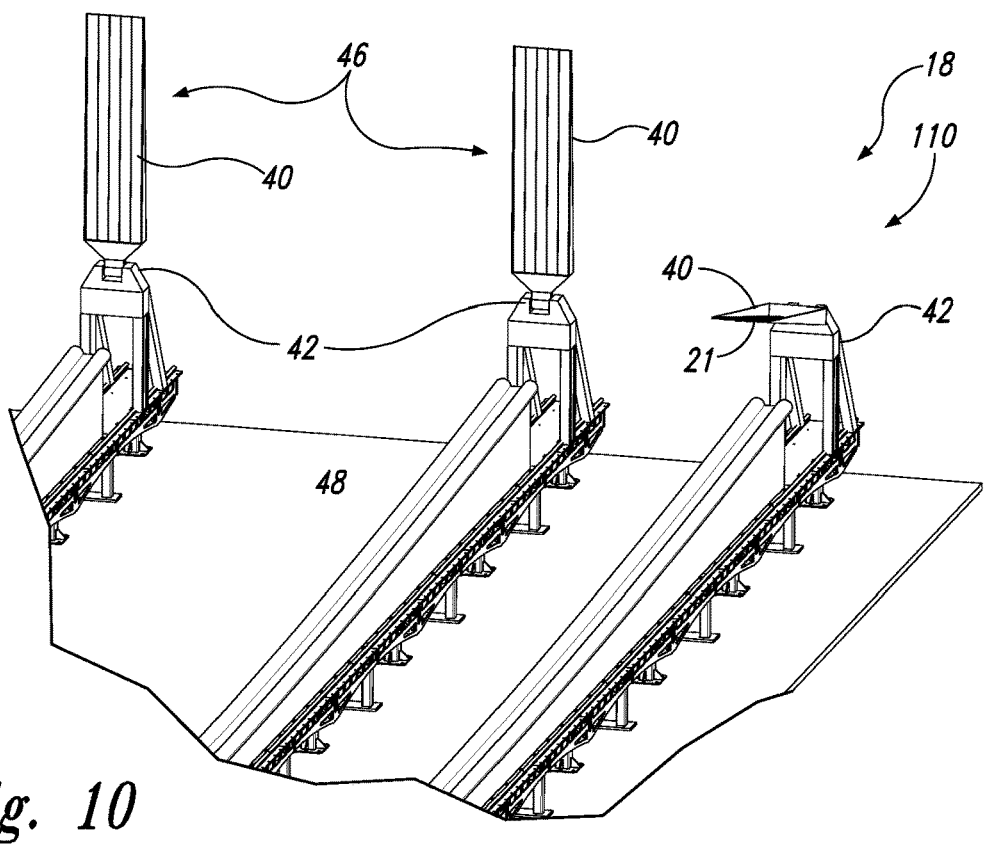
FIG. 10 is a less schematic view of a plurality of ply carriers according to the present disclosure.
Figure 11:
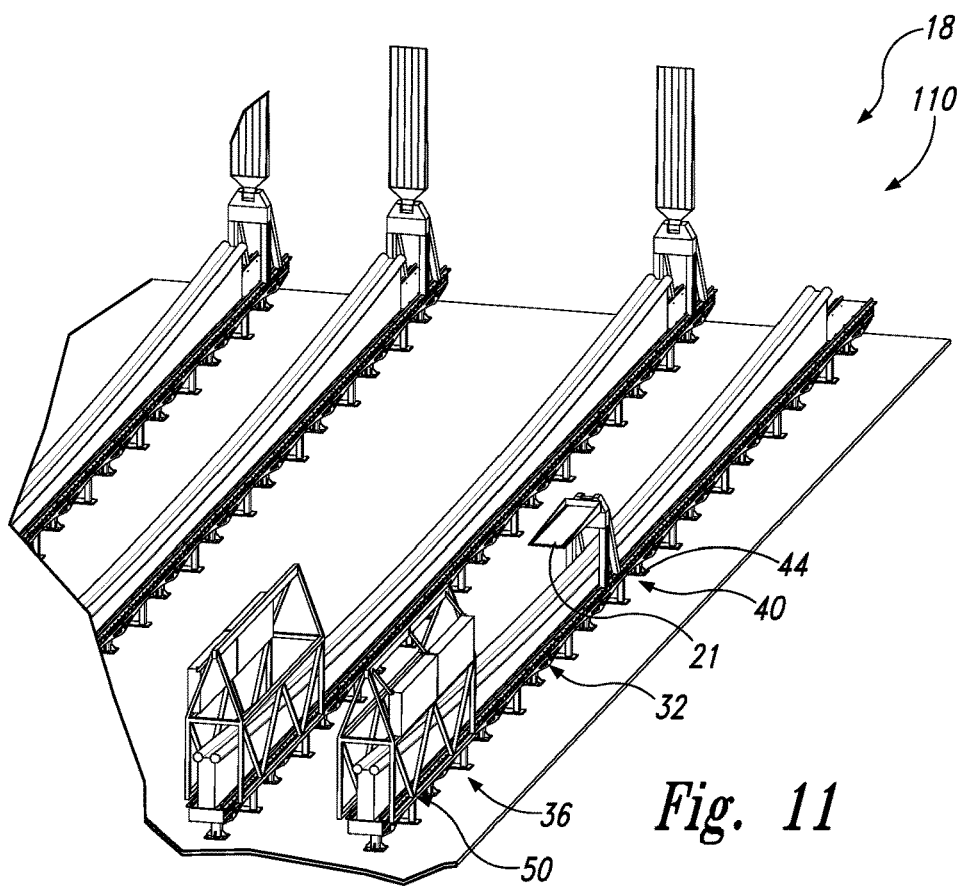
FIG. 11 is a less schematic view of a carrier transfer device conveying a ply carrier along an elongate forming mandrel and to a forming machine, according to the present disclosure.

Subsequently, and as illustrated in FIG. 10, carrier transfer device 40 may transition and/or pivot from the vertical, or upright, orientation 46 to a horizontal orientation 48. This may include pivoting at least a portion of carrier transfer device 40 about a pivot structure 42 thereof. As illustrated in FIG. 11, carrier transfer device 40 then may convey selected ply carrier 21 along a length of an associated elongate forming mandrel 32 and to a selected location 36. This may be accomplished utilizing a carrier transfer robot 44 that may be associated with and/or may form a portion of carrier transfer device 40.

Figure 12:
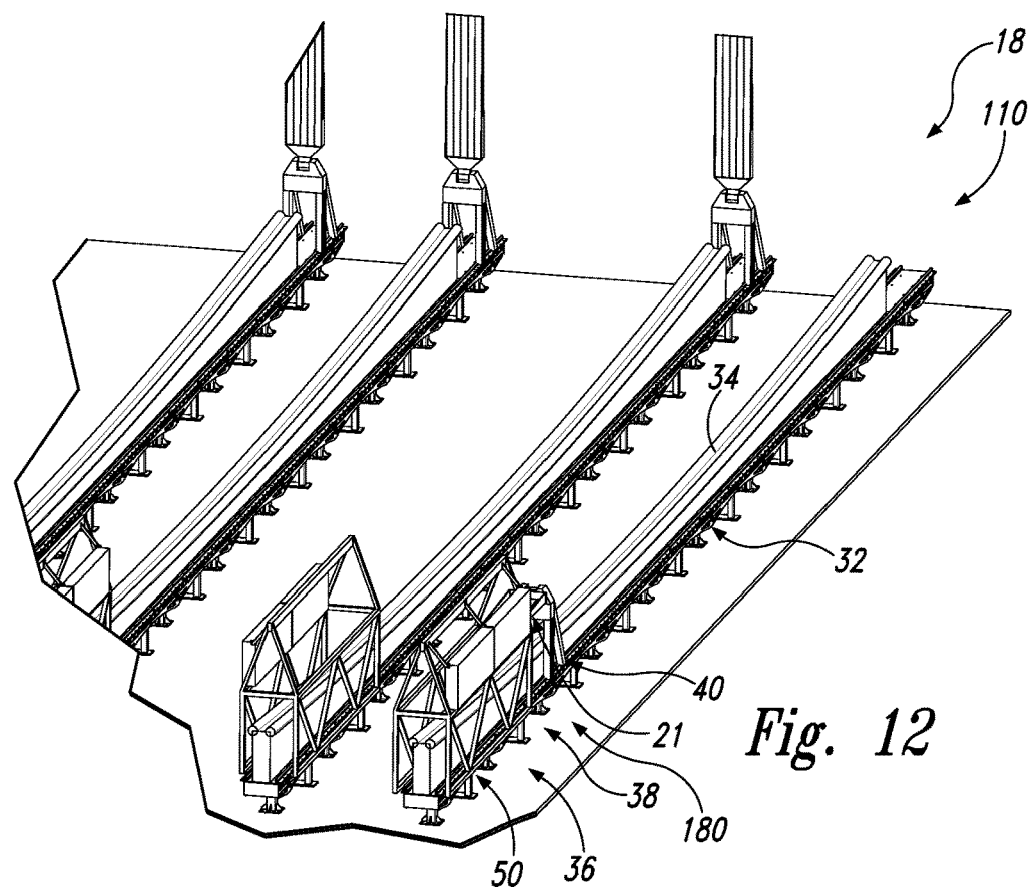
FIG. 12 is a less schematic view of a forming machine receiving a ply carrier from a carrier transfer device, according to the present disclosure.
Figure 13:
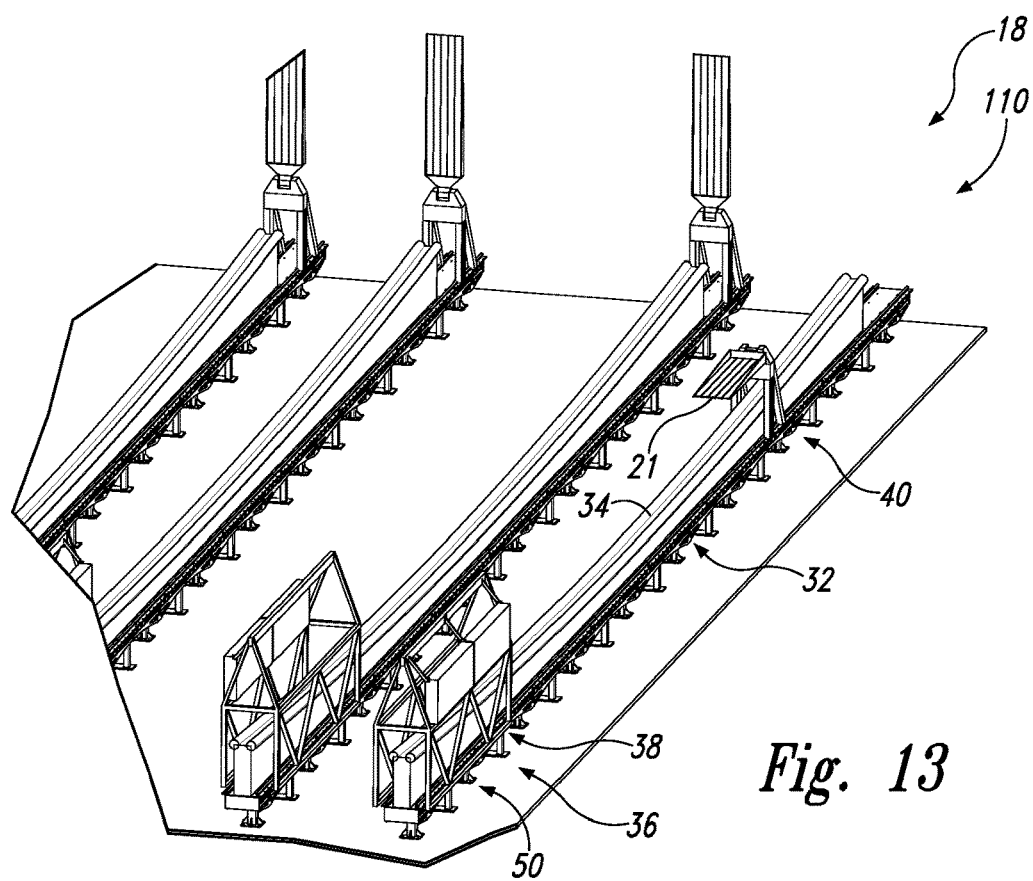
FIG. 13 is a less schematic view of a carrier transfer device conveying a ply carrier along an elongate forming mandrel and from a forming machine, according to the present disclosure.

Forming machine 50 also may move to and/or may be located at selected location 36, and carrier transfer device 40 may transfer selected ply carrier 21 to forming machine 50. This is illustrated in FIG. 12. Forming machine 50 then may deform selected ply carrier 21 and at least one respective ply segment 92 over a selected portion 38 of an elongate ply forming surface 34 that is defined by elongate forming mandrel 32. Subsequently, and as illustrated in FIG. 13, carrier transfer device 40 may return selected ply carrier 21 to ply kitting area 100 while the at least one respective ply segment 92 is retained on selected portion 38.

Figure 14:
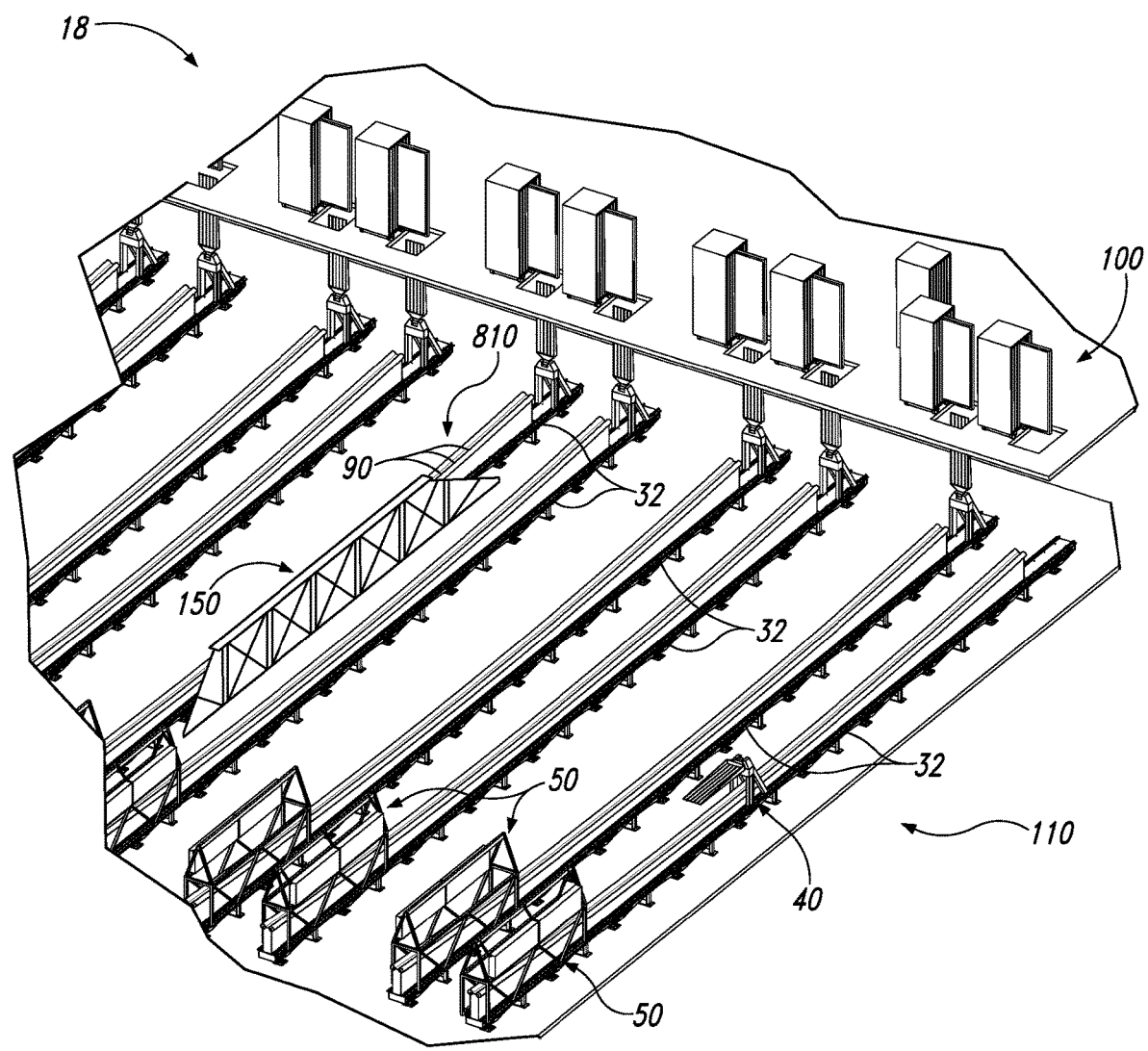
FIG. 14 is a less schematic view of an uncured composite transfer device removing an uncured composite structure from an elongate forming mandrel.

As discussed herein, this process may be repeated any suitable number of times to locate any suitable number of ply segments 92 on elongate ply forming surface 34 such that ply segments 92 generate, create, and/or define a plurality of layered plies 90 that define an uncured composite structure 810. This is illustrated in FIG. 14. As also illustrated in FIG. 14, an uncured composite transfer device 150 then may be utilized to remove a given uncured composite structure 810 from a given elongate forming mandrel 32 and/or to transfer uncured composite structure 810 to a cure mandrel, as discussed in more detail herein.

Figure 15:
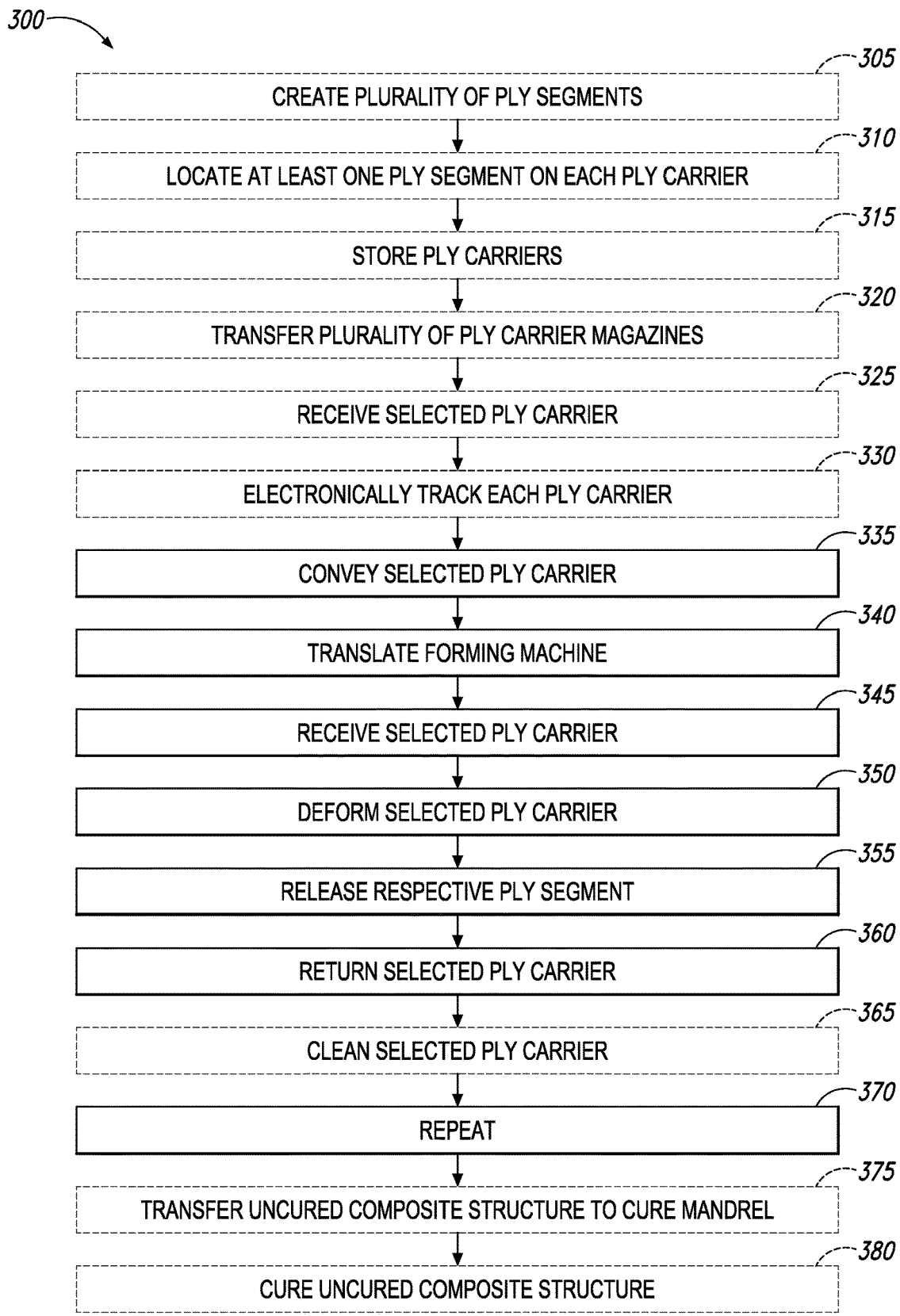
FIG. 15 is flowchart depicting methods, according to the present disclosure, of fabricating a composite structure.

FIG. 15 is a flowchart depicting methods 300, according to the present disclosure, of fabricating a composite structure. Methods 300 may include creating a plurality of ply segments at 305, locating at least one ply segment on each ply carrier of a plurality of ply carriers at 310, storing the plurality of ply carriers within a ply carrier magazine at 315, transferring a plurality of ply carrier magazines at 320, receiving a selected ply carrier from the ply carrier magazine at 325, and/or electronically tracking each ply carrier at 330. Methods 300 include conveying the selected ply carrier at 335, translating a forming machine at 340, receiving the selected ply carrier at 345, deforming the selected ply carrier at 350, releasing a respective ply segment at 355, and returning the selected ply carrier at 360. Methods 300 further may include cleaning the selected ply carrier at 365 and include repeating at least a portion of the methods at 370. Methods 300 also may include transferring an uncured composite structure to a cure mandrel at 375 and/or curing the uncured composite structure at 380.

Creating the plurality of ply segments at 305 may include creating with, or utilizing, a plurality of ply kitting tools. The creating at 305 further may include creating a respective ply segment of the plurality of ply segments with each ply kitting tool in the plurality of ply kitting tools. This may include independently creating a different ply segment with each ply kitting tool and/or concurrently creating at least two ply segments with at least two different ply kitting tools.

As used herein, the phrase, "creating the plurality of ply segments" or simply the word "creating," when utilized in the context of the ply segments, may indicate that the ply segments are created, formed, produced, generated, defined, constructed, built, and/or made in any suitable manner. As an example, and as discussed, the ply segments may be created from a feedstock. This may include cutting the feedstock, severing the feedstock, laying up the feedstock, and/or layering the feedstock.

The creating at 305 may be accomplished in any suitable manner. As an example, the creating at 305 may include cutting a respective ply segment from a composite feedstock. As a more specific example, the creating at 305 may include creating a first ply segment with a first ply kitting tool and concurrently creating a second ply segment with a second ply kitting tool. The first ply segment may be different from the second ply segment. As examples, the first ply segment may have a different boundary, periphery, and/or peripheral shape than the second ply segment. As another example, the first ply segment may have a different fiber orientation than the second ply segment. As yet another example, the first ply segment may be creating from a different material, such as from a different composite feedstock, than the second ply segment.

Locating at least one ply segment on each ply carrier at 310 may include locating with a ply segment locating device and/or locating with the ply kitting tool, as discussed herein.

The locating at 310 may include locating any suitable number of ply segments on each ply carrier and/or locating a different ply segment, or a different number of ply segments, on different ply carriers. As an example, the locating at 310 may include locating a single ply segment on at least one ply carrier. As another example, the locating at 310 also may include locating a plurality of ply segments on at least one, or a different, ply carrier. This may include locating such that the plurality of ply segments defines a plurality of stacked, or layered, ply segments. Additionally or alternatively, this also may include locating such that at least a portion of the plurality of ply segments is spaced apart from a remainder of the plurality of ply segments on a respective ply support surface of the at least one ply carrier. As yet another example, the locating at 310 may include locating such that a first fiber orientation of a first ply segment that is located on the respective ply support surface is different from a second fiber orientation of a second ply segment that is located on the respective ply support surface. It is within the scope of the present disclosure that the locating at 310 further may include vacuum compacting the at least one ply segment on each ply carrier.

Storing the plurality of ply carriers within the ply carrier magazine at 315 may include storing a respective subset of the plurality of ply carriers within each ply carrier magazine. This may include storing any suitable number of ply carriers in each ply carrier magazine and/or storing a different number of ply carriers in at least one ply carrier magazine when compared to at least one other ply carrier magazine. As examples, the storing at 315 may include storing at least 2, at least 3, at least 4, at least 5, at least 6, at least 8, or at least 10 ply carriers in each of the plurality of ply carrier magazines.

It is within the scope of the present disclosure that the ply carriers may include and/or be elongate ply carriers that may have and/or define an elongate axis. Under these conditions, the storing at 315 may include storing the respective subset of the plurality of ply carriers in an upright, or at least substantially upright, orientation. This may include vertically storing, or arranging, the respective subset of the plurality of ply carriers within each ply carrier magazine. Such a configuration may decrease a floor space requirement of the ply carrier magazines, as discussed herein.

It is also within the scope of the present disclosure that the storing at 315 additionally or alternatively may include protecting the respective subset of the plurality of ply carriers from an ambient environment that surrounds the ply carrier magazines. As an example, the storing at 315 may include restricting contact between the respective subset of the plurality of ply carriers and particulate material, such as by sealing the ply carrier magazines and/or by enclosing the respective subset of the plurality of ply carriers within a corresponding ply carrier magazine.

Transferring the plurality of ply carrier magazines at 320 may include transferring from a kitting tool area to a ply carrier staging area. This may include transferring with a magazine transfer device, examples of which are discussed herein.

Receiving the selected ply carrier from the ply carrier magazine at 325 may include receiving the selected ply carrier from a respective ply carrier magazine of the plurality of ply carrier magazines and may be performed prior to the conveying at 335. The receiving at 325 may include receiving with a carrier transfer device, examples of which are discussed herein.

Electronically tracking each ply carrier at 330 may include electronically tracking any suitable parameter and/or characteristic of each ply carrier of the plurality of ply carriers. As an example, the electronically tracking at 330 may include electronically tracking a location of each ply carrier of the plurality of ply carriers. As another example, the electronically tracking at 330 additionally or alternatively may include electronically tracking a structure of at least one ply segment that is supported by each ply carrier of the plurality of ply carriers. As yet another example, the electronically tracking at 330 may include uniquely identifying each ply carrier of the plurality of ply carriers, such as via associating and/or utilizing a unique bar code and/or a unique radio frequency identification tag with each ply carrier. As another example, the electronically tracking at 330 may include maintaining a database of information, such as of the tracked parameters and/or of the characteristics, for each ply carrier.

It is within the scope of the present disclosure that the electronically tracking at 330 may be performed at any suitable time and/or with any suitable sequence during methods 300. As examples, the electronically tracking at 330 may be performed prior to, during, and/or subsequent to the forming at 305, the locating at 310, the storing at 315, the transferring at 320, the receiving at 325, the conveying at 335, the translating at 340, the receiving at 345, the deforming at 350, the releasing at 355, the returning at 360, the cleaning at 365, and/or the repeating at 370.

Conveying the selected ply carrier at 335 may include conveying the selected ply carrier with the carrier transfer device. This may include conveying the selected ply carrier from the ply carrier staging area, from a ply kitting area, from the ply kitting area to a ply assembly area, and/or to a selected location along a length of an elongate forming mandrel. The elongate forming mandrel may define an elongate ply forming surface that is shaped to define a surface contour of the composite structure. In addition, the elongate ply forming surface also may be configured to receive the plurality of ply segments such that the plurality of ply segments defines a plurality of plies of composite material. The plurality of plies of composite material may at least partially produce and/or define the composite structure and/or may define the uncured composite structure.

As discussed in more detail herein, the ply carrier magazines may be located within a ply kitting area and/or within a ply carrier staging area of the ply kitting area. As also discussed in more detail herein, the elongate forming mandrel may be located in a ply assembly area that is different from, spaced-apart from, and/or at a different elevation than the ply kitting area. As an example, the ply kitting area may be spaced apart from the ply assembly area in a vertical direction, such as when the ply kitting area is elevated above the ply assembly area or when the ply assembly area is elevated above the ply kitting area. In addition, the ply kitting area may be at least partially overlapping with the ply assembly area in a horizontal direction.

Under these conditions, the conveying at 335 may include vertically conveying the selected ply carrier from the ply kitting area to the ply assembly area. This may include conveying the selected ply carrier while the selected ply carrier is in the vertical orientation and/or in the horizontal orientation, as discussed herein. This also may include rotating the selected ply carrier to a horizontal orientation prior to conveying the selected ply carrier along the length of the elongate forming mandrel and/or prior to the receiving at 345. In addition, the conveying at 335 also may include horizontally conveying the selected ply carrier along the length of the elongate forming mandrel.

Translating the forming machine at 340 may include translating the forming machine along the length of the elongate forming mandrel and/or translating the forming machine to the selected location. The translating at 340 may be performed at any suitable time and/or with any suitable sequence during methods 300. As examples, the translating at 340 may be at least partially concurrent with the conveying at 335, with the electronically tracking at 330, with the receiving at 325, with the transferring at 320, with the storing at 315, with the locating at 310, and/or with the creating at 305.

Receiving the selected ply carrier at 345 may include receiving the selected ply carrier from the carrier transfer device and/or receiving the selected ply carrier with the forming machine. This may include supporting the selected ply carrier with the forming machine and/or with an end effector of the forming machine.

Deforming the selected ply carrier at 350 may include deforming the selected ply carrier and a respective ply segment, which is supported by the selected ply carrier, with the forming machine. This may include deforming over a selected portion of the elongate ply forming surface. The deforming at 350 may include deforming the selected ply carrier and the respective ply segment in a direction that is transverse to a long, or longitudinal, axis of the ply forming surface. Additionally or alternatively, the deforming at 350 may include locating the respective ply segment between the elongate ply forming surface and the selected ply carrier during the deforming. It is within the scope of the present disclosure that the deforming at 350 further may include compacting the respective ply segment on the elongate ply forming surface. The compacting may be performed during the deforming at 350, as part of the deforming at 350, subsequent to the deforming at 350, and/or subsequent to the releasing at 355. The compacting may be accomplished in any suitable manner, such as utilizing a compaction device that may form a portion of and/or may be associated with the forming machine.

The deforming at 350 may be performed at any suitable time and/or with any suitable sequence during methods 300. As examples, the deforming at 350 may be subsequent to the receiving at 345, to the translating at 340, and/or to the conveying at 335. Additionally or alternatively, the deforming at 350 also may be at least partially concurrent with the electronically tracking at 330, with the receiving at 325, with the transferring at 320, with the storing at 315, with the locating at 310, and/or with the creating at 305.

Releasing the respective ply segment at 355 may include releasing the respective ply segment from the selected ply carrier while retaining the respective ply segment on, in contact with, and/or adhered to the selected portion of the elongate ply forming surface. This may include operatively separating the respective ply segment from the selected ply carrier and/or translating the selected ply carrier away from the respective ply segment.

Returning the selected ply carrier at 360 may include returning the selected ply carrier to the ply kitting area and/or to the carrier transfer device and may be performed subsequent to the deforming at 350 and/or subsequent to the releasing at 355. This may include transferring the selected ply carrier from the forming machine to the carrier transfer device and/or supporting the selected ply carrier with the carrier transfer device. The returning at 360 further may include returning the selected ply carrier to the respective ply carrier magazine.

Cleaning the selected ply carrier at 365 may include cleaning to permit and/or facilitate locating another ply segment on the selected ply carrier. As an example, the selected ply carrier may be re-used a plurality of times during methods 300, such as during the repeating at 370. Under these conditions, it may be desirable to clean and/or condition the ply support surface of the selected ply carrier, such as to decrease a potential for contamination of a ply segment that is supported thereby and/or to increase adhesion between the ply segment and the ply support surface.

The cleaning at 365 may be accomplished in any suitable manner. As an example, the cleaning at 365 may include cleaning with, or by sending the selected ply carrier through, a wash station. It is within the scope of the present disclosure that the cleaning at 365 may be performed at any suitable time, with any suitable sequence, and/or with any suitable frequency during methods 300. As examples, the cleaning at 365 may be performed prior to the locating at 310, prior to each instance of the locating at 310, subsequent to the releasing at 355, subsequent to each instance of the releasing at 355, subsequent to a preselected number of instances of the locating at 310 and/or of the releasing at 355, and/or responsive to detection of greater than a threshold level of contaminants on the ply support surface of the selected ply carrier.

Repeating at least the portion of the methods at 370 may include repeating any suitable portion of methods 300 with any suitable frequency and/or in any suitable order. As an example, the repeating at 370 may include repeating at least the conveying at 335, the translating at 340, the receiving at 345, the deforming at 350, the releasing at 355, and the returning at 360 with all or a portion of the plurality of ply carriers. Each of the plurality of ply carriers may support a respective ply segment, and the repeating may include repeating to locate the plurality of ply segments on the elongate ply forming surface, thereby at least partially producing the uncured composite structure.

The repeating at 370 further may include selecting a location within the uncured composite structure for each ply segment and/or selecting a composition of each ply segment. As discussed, a location and/or composition of each ply segment may be electronically tracked, such as via the tracking at 330, and the location of each ply segment may be selected based, at least in part, on the shape and/or composition of the ply segment. Stated another way, a specific ply segment may be created, such as during the creating at 305, for each location of a plurality of locations within the uncured composite structure, and the repeating at 370 may include selectively locating each ply segment at a corresponding and/or predetermined location within the uncured composite structure.

The repeating at 370 additionally or alternatively may include incrementally translating the forming machine along the length of the forming mandrel. This may include incrementally translating the forming machine a first time to locate a first course, layer, or ply of composite material on the elongate ply forming surface and subsequently incrementally translating the forming machine along the length of the forming mandrel a second time to locate a second course, layer, or ply of composite material on the first course of composite material. The first course of composite material may include a first subset of the plurality of ply segments and the second course of composite material may include a second, or different, subset of the plurality of ply segments. This process may be repeated any suitable number of times to locate and/or build up any suitable number of plies of composite material on the elongate ply forming surface. Stated another way, the repeating at 370 may include repeating to retain the plurality of ply segments on a plurality of different selected portions of the elongate ply forming surface.

Transferring the uncured composite structure to the cure mandrel at 375 may include transferring from the elongate ply forming surface of the elongate forming mandrel to the cure mandrel. The transferring at 375 may be accomplished in any suitable manner. As an example, the transferring at 375 may include transferring with an uncured composite transfer device, examples of which are disclosed herein. It is within the scope of the present disclosure that the transferring at 375 may include transferring a single uncured composite structure to the cure mandrel. Alternatively, it is also within the scope of the present disclosure that, prior to the curing at 380, the transferring at 375 may be repeated to transfer at least one other uncured composite structure, or a plurality of uncured composite structures, to the cure mandrel. The plurality of uncured composite structures then may be cured, such as via the curing at 380, to together, or collectively, define the composite structure.

Curing the uncured composite structure at 380 may include heating the uncured composite structure to cure the uncured composite structure and produce a cured composite structure (i.e., the composite structure). This may include heating with any suitable heating device, examples of which are disclosed herein. When methods 300 include the transferring at 375, the curing at 380 may include curing on the cure mandrel. Alternatively, and when methods 300 do not include the transferring at 375, the curing at 380 may include curing on the elongate forming mandrel.

Figure 16:
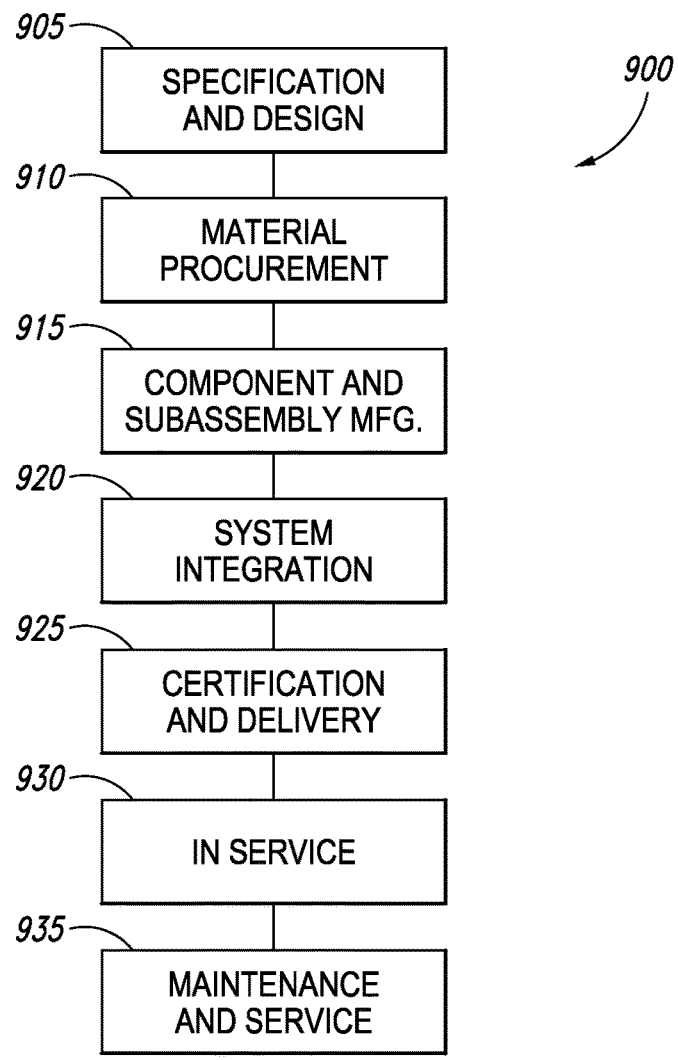
FIG. 16 is a flow diagram of aircraft production and service methodology.
Figure 17:
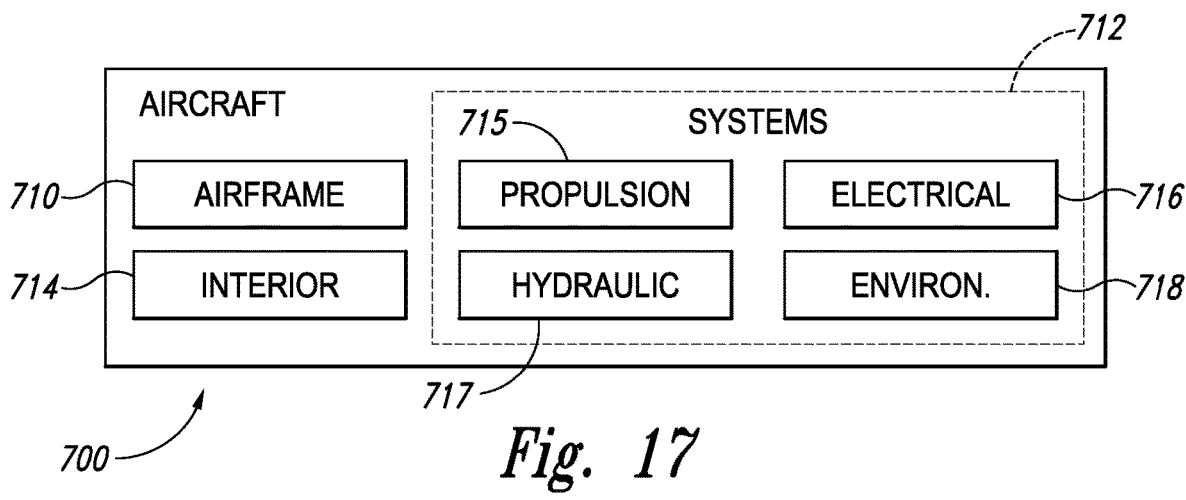
FIG. 17 is a block diagram of an aircraft.

Referring now to FIGS. 16-17, embodiments of the disclosure may be described in the context of an aircraft manufacturing and service method 900, as shown in FIG. 16, and/or an aircraft 700, as shown in FIG. 17. During preproduction, exemplary method 900 may include specification and design 905 of the aircraft 700 and material procurement 910. During production, component and subassembly manufacturing 915 and system integration 920 of the aircraft 700 take place. Thereafter, the aircraft 700 may go through certification and delivery 925 in order to be placed in service 930. While in service by a customer, the aircraft 700 is scheduled for routine maintenance and service 935 (which also may include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 17, aircraft 700 produced by exemplary method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems may be included. Although an aerospace example is shown, the principles of the invention may be applied to other industries, such as the automotive industry.

Systems and methods embodied herein may be employed during any one or more of the stages of the manufacturing and service method 900. For example, components or subassemblies corresponding to component and subassembly manufacturing process 915 may be fabricated or manufactured in a manner similar to components or subassemblies produced while the aircraft 700 is in service. Also, one or more of system embodiments, method embodiments, or a combination thereof may be utilized during the production stages 915 and 920, for example, by substantially expediting assembly of or reducing the cost of an aircraft 700. Similarly, one or more of system embodiments, method embodiments, or a combination thereof may be utilized while the aircraft 700 is in service, for example and without limitation, to maintenance and service 935.

Examples of inventive subject matter according to the present disclosure are described in the following enumerated paragraphs:

A1. A composite structure fabrication system, comprising:

a plurality of ply carriers, wherein each of the plurality of ply carriers defines a ply support surface configured to temporarily support at least one ply segment;

an elongate forming mandrel that defines an elongate ply forming surface, wherein the elongate ply forming surface is shaped to define a surface contour of the composite structure and is configured to receive a plurality of ply segments to define a plurality of plies of composite material that at least partially defines the composite structure;

a carrier transfer device configured to selectively convey a selected ply carrier of the plurality of ply carriers from a ply kitting area to an intermediate location, optionally wherein the carrier transfer device is configured to selectively convey the selected ply carrier from a ply carrier staging area of the ply kitting area, and further optionally wherein the intermediate location includes a selected location along a length of the elongate forming mandrel; and a forming machine configured to receive the selected ply carrier at the intermediate location and to deform the selected ply carrier and a respective ply segment over a selected portion of the elongate ply forming surface, separate the selected ply carrier from the respective ply segment such that the respective ply segment is supported by the selected portion of the elongate ply forming surface, and return the selected ply carrier to the carrier transfer device.

A2. The system of paragraph A1, wherein the system further includes a plurality of ply kitting tools configured to create the plurality of ply segments.

A3. The system of paragraph A2, wherein the plurality of ply kitting tools includes a plurality of automated ply kitting tools.

A4. The system of any of paragraphs A2-A3, wherein the plurality of ply kitting tools includes a plurality of numerically controlled ply kitting tools.

A5. The system of any of kitting tool area paragraphs A2-A4, wherein the plurality of ply kitting tools includes a plurality of ply kitting robots.

A6. The system of any of paragraphs A2-A5, wherein each of the plurality of ply kitting tools is configured to create a respective ply segment of the plurality of ply segments.

A7. The system of any of paragraphs A2-A6, wherein each of the plurality of ply kitting tools is configured to operate independently from a remainder of the plurality of ply kitting tools.

A8. The system of any of paragraphs A2-A7, wherein each of the plurality of ply kitting tools is configured to operate at least partially concurrently with at least one other of the plurality of ply kitting tools.

A9. The system of any of paragraphs A2-A8, wherein each of the plurality of ply kitting tools is configured to cut a/the respective ply segment of the plurality of ply segments from a composite feedstock.

A10. The system of any of paragraphs A2-A9, wherein a first ply kitting tool of the plurality of ply kitting tools is configured to create a first ply segment and a second ply kitting tool of the plurality of ply kitting tools is configured to create a second ply segment.

A11. The system of paragraph A10, wherein the first ply segment is different from the second ply segment.

A12. The system of any of paragraphs A10-A11, wherein the first ply segment has a different shape than the second ply segment.

A13. The system of any of paragraphs A10-A12, wherein the first ply segment has a different fiber orientation than the second ply segment.

A14. The system of any of paragraphs A10-A13, wherein the first ply segment is created from a different composite feedstock than the second ply segment.

A15. The system of any of paragraphs A1-A14, wherein the system further includes a ply segment locating device configured to locate the at least one ply segment on each of the plurality of ply carriers.

A16. The system of paragraph A15, wherein the ply segment locating device forms a portion of a/the ply kitting tool.

A17. The system of any of paragraphs A15-A16, wherein the ply segment locating device includes an automated ply segment locating device.

A18. The system of any of paragraphs A15-A17, wherein the ply segment locating device includes a numerically controlled ply segment locating device.

A19. The system of any of paragraphs A15-A18, wherein the ply segment locating device includes a ply locating robot.

A20. The system of any of paragraphs A15-A19, wherein the ply segment locating device is configured to vacuum compact the at least one ply segment on each of the plurality of ply carriers.

A21. The system of any of paragraphs A15-A20, wherein the system includes a plurality of ply locating assemblies configured to locate the at least one ply segment on a respective subset of the plurality of ply carriers.

A22. The system of paragraph A21, wherein each of the plurality of ply locating assemblies is associated with a respective one of a/the plurality of ply kitting tools.

A23. The system of any of paragraphs A15-A22, wherein the ply segment locating device is configured to locate a single ply segment on at least one of the plurality of ply carriers.

A24. The system of any of paragraphs A15-A23, wherein the ply segment locating device is configured to locate at least two ply segments on at least one of the plurality of ply carriers.

A25. The system of paragraph A24, wherein the at least two ply segments defines a plurality of stacked ply segments on a respective ply support surface of the at least one of the plurality of ply carriers.

A26. The system of any of paragraphs A24-A25, wherein at least a portion of the at least two ply segments is spaced apart from a remainder of the at least two ply segments on a/the respective ply support surface of the at least one of the plurality of ply carriers.

A27. The system of any of paragraphs A24-A26, wherein a first fiber orientation of a first ply of the at least two ply segments is different from a second fiber orientation of a second ply of the at least two ply segments.

A28. The system of any of paragraphs A1-A27, wherein the system further includes a plurality of ply carrier magazines, wherein each of the plurality of ply carrier magazines is configured to contain a respective subset of the plurality of ply carriers.

A29. The system of paragraph A28, wherein each of the plurality of ply carrier magazines is configured to contain at least 2, at least 3, at least 4, at least 5, at least 6, at least 8, or at least 10 ply carriers.

A30. The system of any of paragraphs A28-A29, wherein each of the plurality of ply carrier magazines includes a plurality of slots configured to receive the respective subset of the plurality of ply carriers in a spaced-apart manner.

A31. The system of any of paragraphs A28-A30, wherein each of the plurality of ply carrier magazines is configured to protect the respective subset of the plurality of ply carriers from particulate material.

A32. The system of any of paragraphs A28-A31, wherein each of the plurality of ply carrier magazines is configured to retain the respective subset of the plurality of ply carriers in an at least one of an at least substantially vertical orientation and an at least substantially horizontal orientation.

A33. The system of any of paragraphs A1-A32, wherein the system further includes a magazine transfer device configured to selectively convey a/the plurality of ply carrier magazines from a kitting tool area to a ply carrier staging area.

A34. The system of paragraph A33, wherein the magazine transfer device includes an automated magazine transfer device that optionally is configured to selectively convey the plurality of ply carrier magazines within the ply kitting area and from a kitting tool area to a ply carrier staging area.

A35. The system of any of paragraphs A33-A34, wherein the magazine transfer device includes a numerically controlled magazine transfer device.

A36. The system of any of paragraphs A33-A35, wherein the magazine transfer device includes an automated guided vehicle.

A37. The system of any of paragraphs A33-A36, wherein the magazine transfer device includes a magazine transfer robot.

A38. The system of any of paragraphs A1-A37, wherein the carrier transfer device is an automated carrier transfer device.

A39. The system of any of paragraphs A1-A38, wherein the carrier transfer device is a numerically controlled carrier transfer device.

A40. The system of any of paragraphs A1-A39, wherein the carrier transfer device includes a carrier transfer robot.

A41. The system of any of paragraphs A1-A40, wherein the carrier transfer device is configured to remove the selected ply carrier from a/the ply carrier magazine.

A42. The system of paragraph A41, wherein the ply carrier magazine is located in a ply kitting area and the elongate forming mandrel is located in a ply assembly area.

A43. The system of paragraph A42, wherein the ply kitting area is elevated above the ply assembly area.

A44. The system of paragraph A42, wherein the ply assembly area is elevated above the ply kitting area.

A45. The system of any of paragraphs A42-A44, wherein the ply kitting area is spaced apart from the ply assembly area in a vertical direction.

A46. The system of paragraph A45, wherein the ply kitting area is at least partially overlapping with the ply assembly area in a horizontal direction.

A47. The system of any of paragraphs A42-A46, wherein the carrier transfer device is configured to convey, and optionally vertically convey, the selected ply carrier from the ply kitting area to the ply assembly area.

A48. The system of paragraph A47, wherein the carrier transfer device is configured to convey, and optionally vertically convey, the selected ply carrier while the selected ply carrier is in at least one of a vertical orientation and a horizontal orientation.

A49. The system of any of paragraphs A47-A48, wherein the carrier transfer device includes a pivot structure configured to selectively rotate the selected ply carrier to a horizontal orientation prior to receipt of the selected ply carrier by the forming machine.

A50. The system of any of paragraphs A42-A49, wherein the system includes the ply kitting area.

A51. The system of paragraph A50, wherein a/the ply kitting tool is located in the ply kitting area.

A52. The system of any of paragraphs A50-A51, wherein a/the ply segment locating device is located in the ply kitting area.

A53. The system of any of paragraphs A50-A52, wherein a/the magazine transfer device is located in the ply kitting area.

A54. The system of any of paragraphs A42-A53, wherein the system includes the ply assembly area.

A55. The system of paragraph A54, wherein the elongate forming mandrel is located in the ply assembly area.

A56. The system of any of paragraphs A54-A55, wherein the carrier transfer device is located in the ply assembly area.

A57. The system of any of paragraphs A54-A56, wherein the forming machine is located in the ply assembly area.

A58. The system of any of paragraphs A1-A57, wherein the carrier transfer device is configured to selectively and sequentially convey a plurality of selected ply carriers of the plurality of ply carriers to the intermediate location, and further wherein the forming machine is configured to selectively and sequentially receive each of the plurality of selected ply carriers and to deform each of the plurality of selected ply carriers at respective locations along a length of the elongate forming mandrel.

A59. The system of any of paragraphs A1-A58, wherein the carrier transfer device is configured to horizontally convey the selected ply carrier along the length of the elongate forming mandrel.

A60. The system of any of paragraphs A1-A59, wherein the carrier transfer device is configured to transition to a staging location subsequent to receipt of the selected ply carrier by the forming machine and prior to return of the selected ply carrier from the forming machine to the carrier transfer device.

A61. The system of any of paragraphs A1-A60, wherein, subsequent to return of the selected ply carrier from the forming machine to the carrier transfer device, the carrier transfer device is configured to return the selected ply carrier to the ply carrier magazine.

A62. The system of any of paragraphs A1-A61, wherein the forming machine is an automated forming machine.

A63. The system of any of paragraphs A1-A62, wherein the forming machine is a numerically controlled forming machine.

A64. The system of any of paragraphs A1-A63, wherein the forming machine is a forming robot.

A65. The system of any of paragraphs A1-A64, wherein the forming machine is configured to deform the selected ply carrier and the respective ply segment in a direction that is transverse to a longitudinal axis of the elongate ply forming surface.

A66. The system of any of paragraphs A1-A65, wherein the forming machine includes a forming machine translation device configured to selectively translate the forming machine along the length of the elongate forming mandrel.

A67. The system of any of paragraphs A1-A66, wherein the forming machine includes a compaction device configured to compact the respective ply segment on the selected portion of the elongate ply forming surface.

A68. The system of any of paragraphs A1-A67, wherein the forming machine includes an end effector configured to receive the selected ply carrier from the carrier transfer device.

A69. The system of any of paragraphs A1-A68, wherein the forming machine includes a deformation device configured to selectively deform the selected ply carrier and the respective ply segment over the selected portion of the elongate ply forming surface.

A70. The system of any of paragraphs A1-A69, wherein the forming machine includes a ply release structure configured to selectively separate the respective ply segment from the respective ply support surface.

A71. The system of any of paragraphs A1-A70, wherein a length of the elongate ply forming surface is greater than a length of the respective ply segment.

A72. The system of paragraph A71, wherein the length of the elongate ply forming surface is at least 4, at least 6, at least 8, at least 10, at least 15, or at least 20 times larger than the length of the respective ply segment.

A73. The system of any of paragraphs A1-A72, wherein a/the length of the elongate ply forming surface is greater than a length of any of the plurality of ply segments.

A74. The system of paragraph A73, wherein the length of the elongate ply forming surface is at least 4, at least 6, at least 8, at least 10, at least 15, or at least 20 times larger than the length of any of the plurality of ply segments.

A75. The system of any of paragraphs A1-A74, wherein at least a portion of the plurality of ply segments is spaced-apart along a/the length of the elongate ply forming surface to define a respective ply of the plurality of plies of composite material.

A76. The system of paragraph A75, wherein at least one ply segment of the portion of the plurality of ply segments defines a butt splice with at least one other ply segment of the portion of the plurality of ply segments.

A77. The system of any of paragraphs A75-A76, wherein at least one ply segment of the portion of the plurality of ply segments defines an overlap splice with at least one other ply segment of the portion of the plurality of ply segments.

A78. The system of any of paragraphs A1-A77, wherein at least a portion of the plurality of ply segments defines a layered stack of ply segments.

A79. The system of any of paragraphs A1-A78, wherein the elongate ply forming surface is a nonplanar elongate ply forming surface.

A80. The system of any of paragraphs A1-A79, wherein the elongate ply forming surface is shaped to define a surface contour of a stringer for an aircraft, optionally wherein the stringer includes at least one of a blade stringer, a hat stringer, and a vent stringer.

A81. The system of any of paragraphs A1-A80, wherein a/the length of the elongate ply forming surface is at least 5 meters, at least 10 meters, at least 15 meters, at least 20 meters, at least 25 meters, at least 30 meters, at least 35 meters, or at least 40 meters.

A82. The system of any of paragraphs A1-A81, wherein the system further includes a controller programmed to control operation of at least a portion of the system.

A83. The system of paragraph A82, wherein the controller is programmed to perform the method of any of paragraphs B1-B62.

A84. The system of any of paragraphs A82-A83, wherein the controller is programmed to control the operation of at least one of:
 (i) the carrier transfer device;
 (ii) the forming machine;
 (iii) a/the ply kitting tool;
 (iv) a/the ply segment locating device;
 (v) a/the magazine transfer device; and
 (vi) a wash station.

A85. The system of any of paragraphs A82-A84, wherein the controller is programmed to select a given ply carrier of the plurality of ply carriers for transfer to the intermediate location based, at least in part, on a structure of the at least one ply segment that is supported by the given ply carrier.

A86. The system of any of paragraphs A1-A85, wherein the system further includes a ply carrier tracking system.

A87. The system of paragraph A86, wherein the ply carrier tracking system is configured to electronically track a location of each ply carrier of the plurality of ply carriers.

A88. The system of any of paragraphs A86-A87, wherein the ply carrier tracking system is configured to electronically track a configuration of the at least one ply segment that is supported by each ply carrier of the plurality of ply carriers.

A89. The system of any of paragraphs A86-A88, wherein the ply carrier tracking system forms a portion of a/the controller.

A90. The system of any of paragraphs A86-A89, wherein the ply carrier tracking system includes a unique identification structure that is associated with each ply carrier of the plurality of ply carriers.

A91. The system of paragraph A90, wherein the unique identification structure includes at least one of a bar code and a radio frequency identification (RFID) tag.

A92. The system of any of paragraphs A1-A91, wherein each of the plurality of ply carriers is configured to be re-used.

A93. The system of any of paragraphs A1-A92, wherein each of the plurality of ply carriers is configured to sequentially support a plurality of different ply segments.

A94. The system of any of paragraphs A1-A93, wherein each of the plurality of ply carriers is configured to be cleaned.

A95. The system of any of paragraphs A1-A94, wherein each of the plurality of ply carriers includes at least one of an elastic material, a flexible material, and a latex sheet, which defines the ply support surface.

A96. The system of any of paragraphs A1-A95, wherein each of the plurality of ply carriers includes a rigid elongate support that extends along a length thereof.

A97. The system of any of paragraphs A1-A96, wherein the system further includes an uncured composite transfer device configured to selectively remove an uncured composite structure, which includes the plurality of ply segments, from the elongate ply forming surface of the elongate forming mandrel.

A98. The system of any of paragraphs A1-A97, wherein the system further includes a cure mandrel configured to receive an/the uncured composite structure subsequent to the uncured composite structure being defined on the elongate ply forming surface of the elongate forming mandrel.

A99. The system of paragraph A98, wherein the cure mandrel is configured to receive a plurality of separate uncured composite structures.

A100. The system of any of paragraphs A1-A99, wherein the system further includes a heating device configured to heat an/the uncured composite structure to cure the uncured composite structure and produce a composite structure.

A101. The system of any of paragraphs A1-A100, wherein the system further includes a/the wash station configured to selectively clean a given ply carrier of the plurality of ply carriers.

A102. The system of any of paragraphs A1-A101, wherein the respective ply segment is supported by the ply support surface of the selected ply carrier.

A103. The system of any of paragraphs A1-A102, wherein the selected ply carrier is supported by the carrier transfer device and being conveyed to the selected location along the length of the elongate forming mandrel.

A104. The system of any of paragraphs A1-A103, wherein the selected ply carrier has been received by the forming machine.

A105. The system of any of paragraphs A1-A104, wherein the selected ply carrier and the respective ply segment are being deformed over the selected portion of the elongate ply forming surface.

A106. The system of paragraph A105, wherein the respective ply segment is located between the selected portion of the elongate ply forming surface and the selected ply carrier.

A107. The system of any of paragraphs A1-A106, wherein the system further includes the respective ply segment.

A108. The system of paragraph A107, wherein the respective ply segment is released from the selected ply carrier and supported by the selected portion of the elongate ply forming surface, and further wherein the selected ply carrier is supported by the carrier transfer device.

A109. The system of any of paragraphs A1-A108, wherein the plurality of ply segments includes at least one of a fiberglass, a fiberglass cloth, a carbon fiber, a carbon fiber cloth, a cloth, a pre-impregnated (pre-preg) composite material, a resin material, and/or an epoxy.

B1. A method of fabricating a composite structure, the method comprising:
conveying, optionally with at least one of a carrier transfer device and a forming machine, a selected ply carrier from a ply kitting area to a selected location along a length of an elongate forming mandrel that defines an elongate ply forming surface, wherein the elongate ply forming surface is shaped to define a surface contour of the composite structure and is configured to receive a plurality of ply segments to define a plurality of plies of composite material that at least partially defines the composite structure;
translating the forming machine along the length of the elongate forming mandrel to the selected location;
receiving the selected ply carrier, optionally from the carrier transfer device, with the forming machine;
deforming, with the forming machine, the selected ply carrier and a respective ply segment, which is supported by the selected ply carrier, over a selected portion of the elongate ply forming surface;
releasing the respective ply segment from the selected ply carrier while retaining the respective ply segment on the selected portion of the elongate ply forming surface;
returning, with the forming machine, the selected ply carrier to at least one of the ply kitting area and the carrier transfer device; and
repeating the conveying, the translating, the receiving, the deforming, the releasing, and the returning with a plurality of ply carriers, which each supports a respective ply segment, to locate the plurality of ply segments on the elongate ply forming surface and at least partially define an uncured composite structure.

B2. The method of paragraph B1, wherein the method further includes creating the plurality of ply segments.

B3. The method of paragraph B2, wherein the creating includes creating the plurality of ply segments with a plurality of ply kitting tools.

B4. The method of paragraph B3, wherein the creating includes creating a respective ply segment of the plurality of ply segments with each ply kitting tool of the plurality of ply kitting tools.

B5. The method of any of paragraphs B3-B4, wherein the creating includes independently creating a different ply segment of the plurality of ply segments with each ply kitting tool of the plurality of ply kitting tools.

B6. The method of any of paragraphs B3-B5, wherein the creating includes concurrently creating at least two ply segments of the plurality of ply segments with two different ply kitting tools of the plurality of ply kitting tools.

B7. The method of any of paragraphs B3-B6, wherein the creating includes cutting a respective ply of the plurality of ply segments from a composite feedstock.

B8. The method of any of paragraphs B3-B7, wherein the creating includes creating a first ply segment with a first ply kitting tool and concurrently creating a second ply segment with a second ply kitting tool.

B9. The method of paragraph B8, wherein the first ply segment has a different ply boundary than the second ply segment.

B10. The method of any of paragraphs B8-B9, wherein the first ply segment has a different fiber orientation than the second ply segment.

B11. The method of any of paragraphs B8-B10, wherein the first ply segment is created from a different composite feedstock than the second ply segment.

B12. The method of any of paragraphs B1-B11, wherein the method further includes locating at least one ply segment on each ply carrier of the plurality of ply carriers.

B13. The method of paragraph B12, wherein the locating includes locating with a ply segment locating device.

B14. The method of any of paragraphs B12-B13, wherein the locating further includes vacuum compacting the at least one ply segment on each ply carrier of the plurality of ply carriers.

B15. The method of any of paragraphs B12-B14, wherein the locating includes locating a single ply segment on at least one of the plurality of ply carriers.

B16. The method of any of paragraphs B12-B15, wherein the locating includes locating at least two ply segments on at least one of the plurality of ply carriers.

B17. The method of paragraph B16, wherein the locating includes locating such that the at least two ply segments defines a plurality of stacked ply segments.

B18. The method of any of paragraphs B16-B17, wherein the locating includes locating such that at least a portion of the at least two ply segments is spaced apart from a remainder of the at least two ply segments on a respective ply support surface of the at least one of the plurality of ply carriers.

B19. The method of any of paragraphs B16-B18, wherein the locating includes locating such that a first fiber orientation of a first ply segment of the at least two ply segments is different from a second fiber orientation of a second ply segment of the at least two ply segments.

B20. The method of any of paragraphs B1-B19, wherein the method further includes storing a respective subset of the plurality of ply carriers within each of a plurality of ply carrier magazines.

B21. The method of paragraph B20, wherein the storing includes storing at least 2, at least 3, at least 4, at least 5, at least 6, at least 8, or at least 10 ply carriers in each of the plurality of ply carrier magazines.

B22. The method of any of paragraphs B20-B21, wherein the storing includes vertically storing the respective subset of the plurality of ply carriers within each of the plurality of ply carrier magazines.

B23. The method of any of paragraphs B20-B22, wherein the storing includes restricting contact between the respective subset of the plurality of ply carriers and particulate material with each of the plurality of ply carrier magazines.

B24. The method of any of paragraphs B1-B23, wherein the method further includes transferring a/the plurality of ply carrier magazines from a kitting tool area to a ply carrier staging area.

B25. The method of paragraph B24, wherein the transferring includes transferring with a magazine transfer device.

B26. The method of any of paragraphs B1-B25, wherein, prior to the conveying, the method further includes receiving the selected ply carrier from a respective ply carrier magazine of a/the plurality of ply carrier magazines.

B27. The method of paragraph B26, wherein the plurality of ply carrier magazines is located in a ply kitting area and the elongate forming mandrel is located in a ply assembly area.

B28. The method of paragraph B27, wherein the ply kitting area is elevated above the ply assembly area.

B29. The method of any of paragraphs B27-B28, wherein the ply assembly area is elevated above the ply kitting area.

B30. The method of any of paragraphs B27-B29, wherein the ply kitting area is spaced apart from the ply assembly area in a vertical direction.

B31. The method of paragraph B30, wherein the ply kitting area is at least partially overlapping with the ply assembly area in a horizontal direction.

B32. The method of any of paragraphs B27-B31, wherein the conveying includes vertically conveying the selected ply carrier from the ply kitting area to the ply assembly area.

B33. The method of any of paragraphs B27-B32, wherein the conveying includes conveying the selected ply carrier while the selected ply carrier is in at least one of a vertical orientation and a horizontal orientation.

B34. The method of any of paragraphs B27-B33, wherein the conveying further includes rotating the selected ply carrier to a horizontal orientation prior to the receiving the selected ply carrier from the ply carrier magazine.

B35. The method of any of paragraphs B1-B34, wherein the method further includes transferring the uncured composite structure from the elongate ply forming surface of the elongate forming mandrel to a cure mandrel.

B36. The method of paragraph B35, wherein the method further includes transferring at least one additional uncured composite structure to the cure mandrel.

B37. The method of any of paragraphs B35-B36, wherein the transferring the uncured composite structure includes transferring with an uncured composite transfer device.

B38. The method of any of paragraphs B1-B37, wherein the method further includes heating the uncured composite structure to cure the uncured composite structure and produce a cured composite structure.

B39. The method of paragraph B38, wherein the heating includes heating with a heating device.

B40. The method of any of paragraphs B1-B39, wherein the method further includes cleaning the selected ply carrier.

B41. The method of paragraph B40, wherein the cleaning includes cleaning with a wash station.

B42. The method of any of paragraphs B1-B41, wherein the method further includes electronically tracking a location of each ply carrier of the plurality of ply carriers.

B43. The method of any of paragraphs B1-B42, wherein the method further includes electronically tracking a structure of at least one ply segment that is supported by each ply carrier of the plurality of ply carriers.

B44. The method of any of paragraphs B1-B43, wherein the method further includes uniquely identifying each ply carrier of the plurality of ply carriers.

B45. The method of paragraph B44, wherein the uniquely identifying includes at least one of associating a unique bar code with each ply carrier of the plurality of ply carriers and associating a unique radio frequency identification tag with each ply carrier of the plurality of ply carriers.

B46. The method of any of paragraphs B1-B45, wherein the method further includes maintaining a database of information regarding each ply carrier of the plurality of ply carriers.

B47. The method of any of paragraphs B1-B46, wherein the conveying includes conveying with a carrier transfer device.

B48. The method of any of paragraphs B1-B47, wherein the translating includes translating at least partially concurrently with the conveying.

B49. The method of any of paragraphs B1-B48, wherein the receiving the selected ply carrier from the carrier transfer device includes supporting the selected ply carrier with the forming machine.

B50. The method of any of paragraphs B1-B49, wherein the receiving the selected ply carrier from the carrier transfer device includes receiving the selected ply carrier with an end effector of the forming machine.

B51. The method of any of paragraphs B1-B50, wherein the deforming includes deforming the selected ply carrier and the respective ply segment in a direction that is transverse to a longitudinal axis of the elongate ply forming surface.

B52. The method of any of paragraphs B1-B51, wherein the method includes locating the respective ply segment between the elongate ply forming surface and the selected ply carrier during the deforming.

B53. The method of any of paragraphs B1-B52, wherein the deforming includes compacting the respective ply segment on the elongate ply forming surface.

B54. The method of paragraph B53, wherein the compacting includes compacting with a compaction device of the forming machine.

B55. The method of any of paragraphs B1-B54, wherein the releasing includes operatively separating the respective ply segment from the selected ply carrier sheet.

B56. The method of any of paragraphs B1-B55, wherein the returning includes supporting the selected ply carrier with the carrier transfer device.

B57. The method of any of paragraphs B1-B56, wherein the returning further includes returning the selected ply carrier to a/the respective ply carrier magazine.

B58. The method of any of paragraphs B1-B57, wherein the repeating includes selecting both a location within the uncured composite structure for and a composition of each ply segment of the plurality of ply segments.

B59. The method of any of paragraphs B1-B58, wherein the repeating includes incrementally translating the forming machine along the length of the forming mandrel a first time to locate a first course of composite material on the elongate ply forming surface and subsequently incrementally translating the forming machine along the length of the forming mandrel a second time to locate a second course of composite material on the first course of composite material, wherein the first course of composite material includes a first subset of the plurality of ply segments, and further wherein the second course of composite material includes a second subset of the plurality of ply segments.

B60. The method of any of paragraphs B1-B59, wherein the repeating includes repeating to retain the plurality of ply segments on a plurality of different selected portions of the elongate ply forming surface.

B61. The method of any of paragraphs B1-B60, wherein the plurality of ply segments includes at least one of a fiberglass, a fiberglass cloth, a carbon fiber, a carbon fiber cloth, a cloth, a pre-impregnated (pre-preg) composite material, a resin material, and/or an epoxy.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of systems and steps of methods disclosed herein are not required to all systems and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A method of fabricating a composite structure, the method comprising:
   conveying a selected ply carrier from a ply kitting area to a selected location along a length of an elongate forming mandrel that defines an elongate ply forming surface, wherein the elongate ply forming surface is shaped to define a surface contour of the composite structure and is configured to receive a plurality of ply segments to define a plurality of plies of composite material that at least partially defines the composite structure, and further wherein the conveying includes conveying with a carrier transfer device;
   translating a forming machine along the length of the elongate forming mandrel to the selected location, wherein the forming machine is configured to move along the length of the elongate forming mandrel independent of the carrier transfer device;
   receiving the selected ply carrier from the carrier transfer device and with the forming machine;
   deforming, with the forming machine, the selected ply carrier and a respective ply segment, which is supported by the selected ply carrier, over a selected portion of the elongate ply forming surface;
   releasing the respective ply segment from the selected ply carrier while retaining the respective ply segment on the selected portion of the elongate ply forming surface;
   returning, with the forming machine, the selected ply carrier to the ply kitting area; and
   repeating the conveying, the translating, the receiving, the deforming, the releasing, and the returning with a plurality of ply carriers, which each supports a respective ply segment, to locate the plurality of ply segments on the elongate ply forming surface and at least partially define an uncured composite structure.

2. The method of claim 1, wherein the method further includes creating the plurality of ply segments, wherein the creating includes independently creating a respective ply segment of the plurality of ply segments with each ply kitting tool of a plurality of ply kitting tools.

3. The method of claim 2, wherein the creating includes concurrently creating at least two ply segments of the plurality of ply segments with two different ply kitting tools of the plurality of ply kitting tools.

4. The method of claim 1, wherein the method further includes storing a respective subset of the plurality of ply carriers within each of a plurality of ply carrier magazines.

5. The method of claim 4, wherein the storing includes storing at least 2 ply carriers in each of the plurality of ply carrier magazines.

6. The method of claim 4, wherein the storing includes vertically storing the respective subset of the plurality of ply carriers within each of the plurality of ply carrier magazines.

7. The method of claim 1, wherein the method further includes transferring the uncured composite structure from the elongate ply forming surface of the elongate forming mandrel to a cure mandrel.

8. The method of claim 7, wherein the method further includes transferring at least one additional uncured composite structure to the cure mandrel.

9. The method of claim 1, wherein the method further includes heating the uncured composite structure to cure the uncured composite structure and produce a cured composite structure.

10. The method of claim 1, wherein the method further includes cleaning the selected ply carrier.

11. The method of claim 1, wherein the method further includes electronically tracking a location of each ply carrier of the plurality of ply carriers.

12. The method of claim 1, wherein the method further includes electronically tracking a structure of at least one ply segment that is supported by each ply carrier of the plurality of ply carriers.

13. The method of claim 1, wherein the method further includes uniquely identifying each ply carrier of the plurality of ply carriers.

14. The method of claim 1, wherein the method further includes maintaining a database of information regarding each ply carrier of the plurality of ply carriers.

15. The method of claim 1, wherein the method includes locating the respective ply segment between the elongate ply forming surface and the selected ply carrier during the deforming.

16. The method of claim 1, wherein the repeating includes selecting both a location within the uncured composite structure for each ply segment of the plurality of ply segments and a composition of each ply segment of the plurality of ply segments.

17. The method of claim 1, wherein the repeating includes incrementally translating the forming machine along the length of the forming mandrel a first time to locate a first course of composite material on the elongate ply forming surface and subsequently incrementally translating the forming machine along the length of the forming mandrel a second time to locate a second course of composite material on the first course of composite material, wherein the first course of composite material includes a first subset of the plurality of ply segments, and further wherein the second course of composite material includes a second subset of the plurality of ply segments.

18. The method of claim 1, wherein the translating includes translating at least partially concurrently with the conveying.

19. The method of claim 1, wherein the deforming includes deforming the selected ply carrier and the respective ply segment in a direction that is transverse to a longitudinal axis of the elongate ply forming surface.

20. The method of claim 1, wherein the deforming includes compacting the respective ply segment on the elongate ply forming surface.

* * * * *